(12) United States Patent
Mayo

(10) Patent No.: US 11,847,219 B2
(45) Date of Patent: Dec. 19, 2023

(54) DETERMINING A STATE OF A NETWORK

(71) Applicant: 1E Limited, London (GB)

(72) Inventor: Andrew Mayo, Maidenhead (GB)

(73) Assignee: 1E Limited, London (GB)

( * ) Notice: Subject to any disclaimer, the term of this patent is extended or adjusted under 35 U.S.C. 154(b) by 589 days.

(21) Appl. No.: 16/899,020

(22) Filed: Jun. 11, 2020

(65) Prior Publication Data

US 2020/0401695 A1 Dec. 24, 2020

(30) Foreign Application Priority Data

Jun. 20, 2019 (GB) ...................................... 1908863

(51) Int. Cl.
| | |
|---|---|
| G06F 21/56 | (2013.01) |
| H04L 41/0853 | (2022.01) |
| G06F 21/50 | (2013.01) |
| G06F 21/57 | (2013.01) |
| G06F 16/13 | (2019.01) |
| G06F 16/174 | (2019.01) |
| G06F 21/64 | (2013.01) |
| G06F 16/14 | (2019.01) |
| H03M 7/30 | (2006.01) |

(52) U.S. Cl.
CPC .......... *G06F 21/564* (2013.01); *G06F 16/137* (2019.01); *G06F 16/152* (2019.01); *G06F 16/1748* (2019.01); *G06F 21/50* (2013.01); *G06F 21/565* (2013.01); *G06F 21/64* (2013.01); *H03M 7/3088* (2013.01); *H04L 41/0853* (2013.01); *G06F 21/57* (2013.01)

(58) Field of Classification Search
USPC ........................................................ 726/24
See application file for complete search history.

(56) References Cited

U.S. PATENT DOCUMENTS

| | | | |
|---|---|---|---|
| 6,847,982 B2 | 6/2005 | Parker et al. | |
| 7,305,383 B1* | 12/2007 | Kubesh | ................ G05B 19/045 |
| 7,765,410 B2* | 7/2010 | Costea | .................... G06F 21/56 |
| | | | 726/28 |

(Continued)

OTHER PUBLICATIONS

Waltermire, David "Software Asset Managemnt, Continuous Monitoring" Sep. 16, 2015, V.2, Building Block.

(Continued)

*Primary Examiner* — Sakinah White Taylor
(74) *Attorney, Agent, or Firm* — EIP US LLP

(57) ABSTRACT

A client computing device has a storage device storing a plurality of files and a system agent. The system agent applies a hash function to binary data read from the plurality of files to generate a set of data signatures. A server computing device has a database interface to access a database representing a state of the network and storage for a set of exemplar data signatures resulting from a scan of one or more exemplar computing devices, each data signature generated by applying a hash function to binary data representing a file. The client computing device is configured to receive and compare the set of exemplar data signatures with the generated set of data signatures, and to transmit data to the server computing device based on the comparison. The server computing device is configured to obtain data received from the client computing device and update records in the database.

10 Claims, 14 Drawing Sheets

(56) References Cited

U.S. PATENT DOCUMENTS

| | | | |
|---|---|---|---|
| 8,086,627 B2 | 12/2011 | Pastorelli et al. | |
| 8,677,480 B2 * | 3/2014 | Yen | H04L 63/1416 709/224 |
| 9,003,476 B2 * | 4/2015 | Baumhof | G06F 21/606 713/168 |
| 9,485,145 B1 | 11/2016 | Bonczkowski et al. | |
| 9,629,928 B1 | 4/2017 | Olsen | |
| 9,646,284 B1 | 5/2017 | Lew et al. | |
| 9,690,746 B1 | 6/2017 | Hosea et al. | |
| 2005/0238011 A1 * | 10/2005 | Panigrahy | H04L 63/0254 370/389 |
| 2005/0278395 A1 | 12/2005 | Sandaire | |
| 2006/0195566 A1 | 8/2006 | Hurley | |
| 2008/0049644 A1 | 2/2008 | Halbert | |
| 2010/0122120 A1 * | 5/2010 | Lin | H04L 41/06 714/E11.178 |
| 2012/0255017 A1 * | 10/2012 | Sallam | G06F 9/45558 726/24 |
| 2014/0006796 A1 * | 1/2014 | Smith | G06F 21/645 713/187 |
| 2014/0317255 A1 | 10/2014 | Krishna | |
| 2015/0150006 A1 * | 5/2015 | Fitzgerald | G06F 9/45537 718/1 |
| 2020/0266996 A1 * | 8/2020 | Carrott | H04L 63/0838 |

OTHER PUBLICATIONS

Combined Search & Exam Report dated Dec. 4, 2019 for GB Application GB1908863.2.

* cited by examiner

```
[fc64f854b1bc6ca92fe37719011b0247]

[abcc24a627f95a8886051985c6eea5a8]

[e0f601b8b8b8653a77750e2abf34977a]

[1815db39641a48403c8bb1e41e936dda]

[3670f5c9ac265da73edafda45e881773]

[6ad8c97dce429894953e757e1714b9cf]

[f8d0c22b975310ba1e644164ebb21003]

[52eab8f6fd8caf339ac48ea6b7921c65]

[dec5b3abf1f7cb34fa63e3d524a5239c]

[0596cdb15a09310b6e39f1e4611a1b5a]

[401f39d1ae3712fce91dd30b069644fe]
```

500

510  520

```
[0]  □
[1]  ■
[1]  ■
[0]  □
[1]  ■
[0]  □
[0]  □
[1]  ■
[1]  ■
[1]  ■
[1]  ■
```

530 `[1 0 2 1 1 0 1 1 2 0 4 1]`

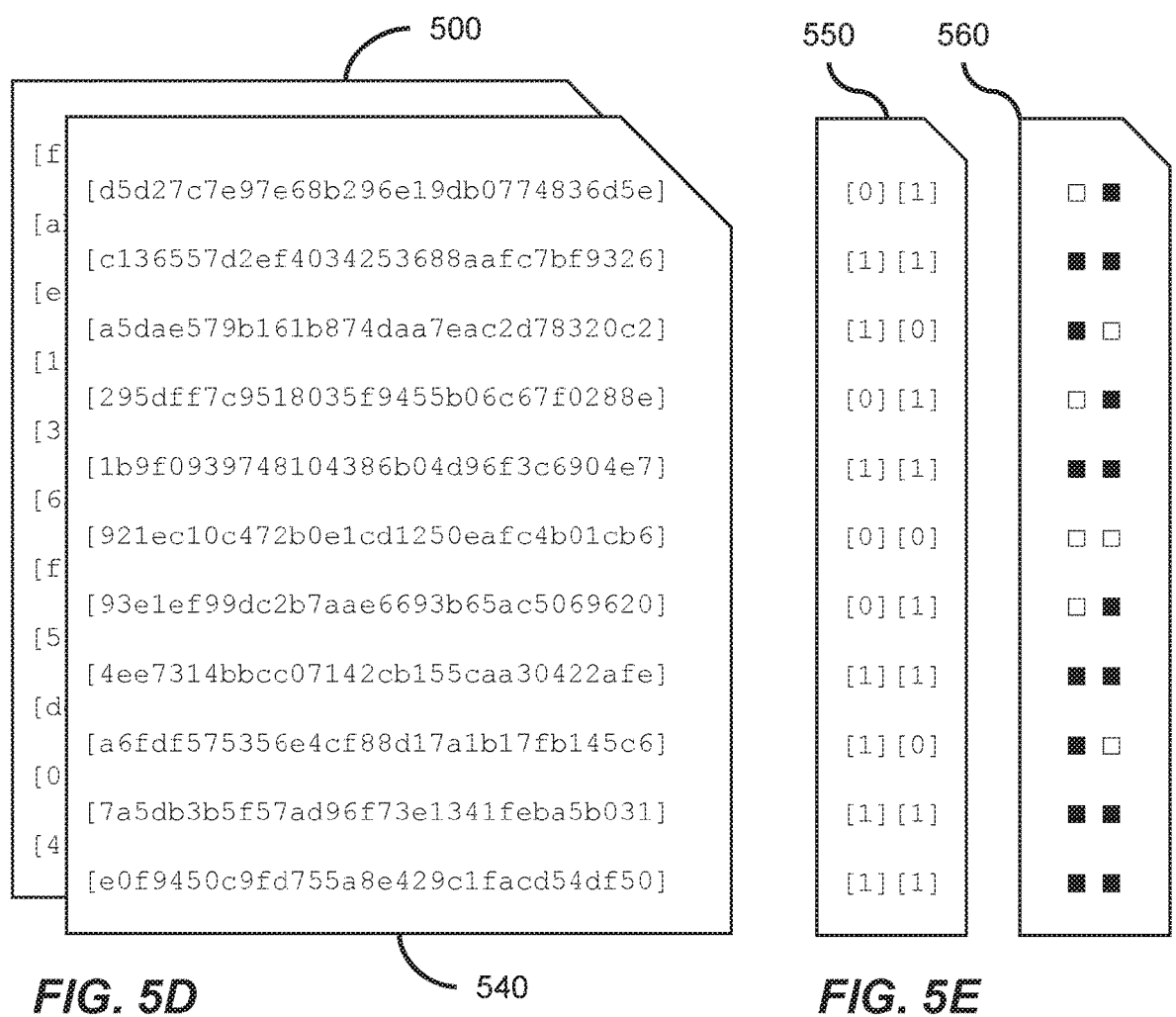

DETERMINING A STATE OF A NETWORK

CROSS-REFERENCE TO RELATED APPLICATIONS

This application claims priority to GB Application No. GB 1908863.2, filed Jun. 20, 2019, under 35 U.S.C. § 119(a). The above-referenced patent application is incorporated by reference in its entirety.

BACKGROUND OF THE INVENTION

Technical Field

The present invention relates to determining a state of a network having one or more computing devices connected to the network and having access to a set of files.

Background

Ensuring that a network of computing devices is secure is a challenge. Modern computer networks may comprise multiple interconnected networks, each network having a changeable set of coupled computing devices. The networks may be distributed geographically, e.g. in sites all over the world. The computing devices may come in a variety of forms, from blades in a large-scale data warehouse to mobile computing devices to embedded nodes within a sensor network. The proliferation of computing devices has also seen a rise in "bring your own device" behaviour, where users of a network regularly attach their own personal computing devices to the network, as opposed to computing devices that are centrally managed and controlled.

To manage and control a network, it is often desired to obtain an inventory of files that are stored on computing devices within the network. For example, knowing what executable code is present on a coupled computing device may help locate and neutralise security threats with respect to the network, such as malicious code and/or unauthorised access. An inventory may also help with operating system versioning and patching, e.g. help identify computing devices that are susceptible to a particular exploit. A large network may have a huge range of executable code, and exploits may be discovered at a daily or weekly rate. When an exploit is discovered, holes in the security of the network are to be patched as quickly as possible.

However, determining and maintaining an inventory for a computer network at scale is difficult. For example, in the real-world, a large enterprise network may have 500,000 endpoint devices, where the average number of executable files per device may be between 20,000 and 40,000. The number of files that include non-executable files may be much higher. Some devices can have significantly more than this number of files, e.g. local servers may have around 150,000 (or "150 k") files. In this case, an inventory database accounting for 500 k devices and having 40 k rows of data for each device, would result in 20 k million, or $2\times10^{10}$, rows of data in a database. Accounting for an average row length of approximately 300 bytes per entry, the storage requirements become $6\times10^{12}$ bytes or 6,000 gigabytes. Hence, the task quickly becomes intractable, and the scales become larger year-on-year.

Notwithstanding data storage issues, there are also significant network challenges. For example, the state of any network is dynamic, and so data is often collected on a regular basis. However, transferring inventory information from each computing device, e.g. from each of 500 k endpoints coupled to networks of varying size and speed, leads to significant network traffic.

It is therefore desirable to address both the storage and network traffic challenges when attempting to determine a state of a network.

SUMMARY

Aspects of the present invention are set out in the appended claims.

Further features and advantages of the invention will become apparent from the following description of preferred embodiments of the invention, given by way of example only, which is made with reference to the accompanying drawings.

BRIEF DESCRIPTION OF THE DRAWINGS

FIGS. 5A and 5D are schematic diagrams showing sets of exemplar data signatures according to examples;

FIGS. 5B and 5E are schematic diagrams showing state bitmaps according to examples;

FIG. 5C is a schematic diagram showing a compressed version of a state bitmap according to an example;

DETAILED DESCRIPTION

Figure 1A:
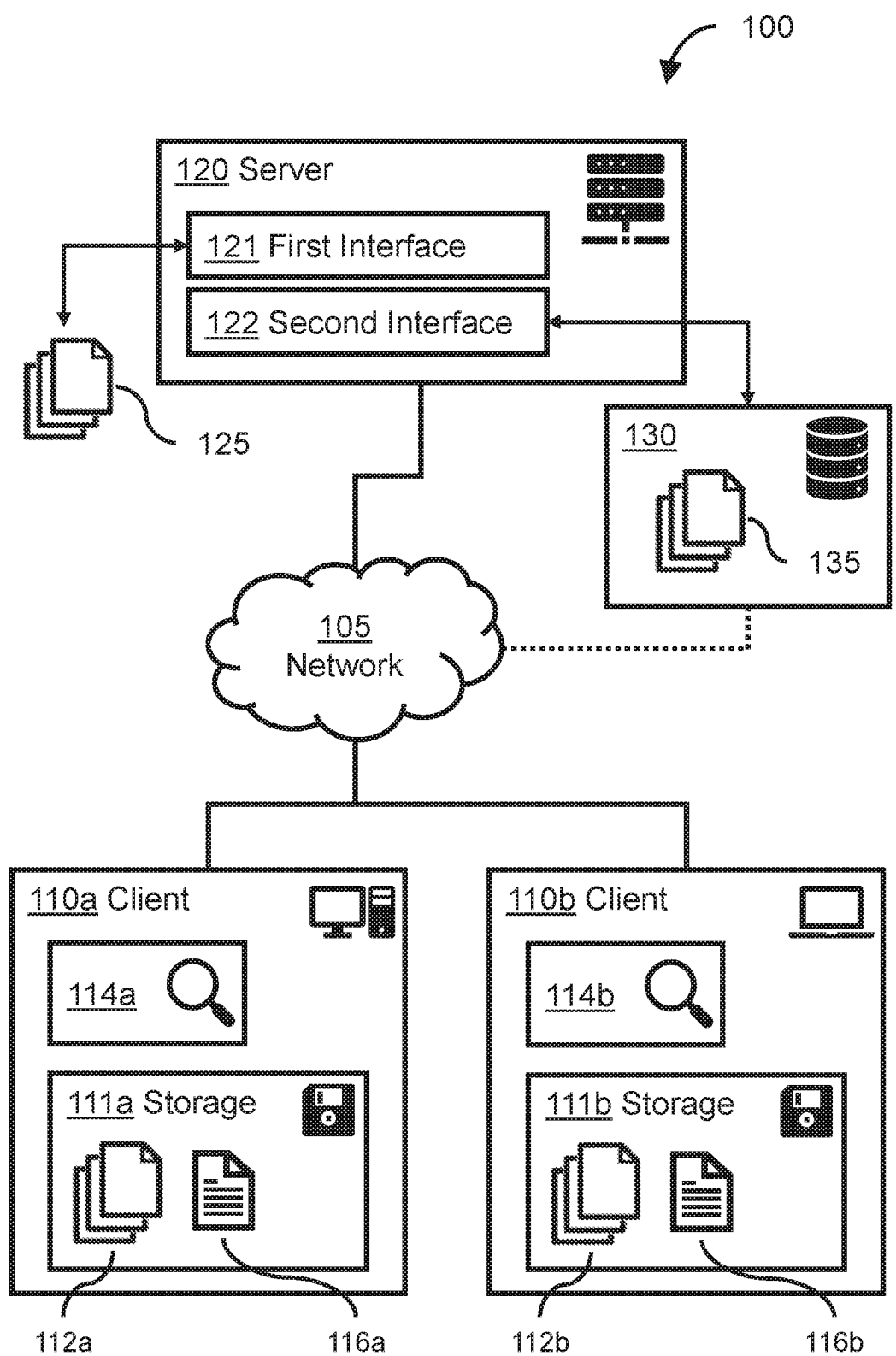
FIGS. 1A and 1B are schematic diagrams showing the components of a network computer system according to examples.

Certain examples described herein relate to efficiently determining a state of a network of computing devices.

A computing device may be, for example, a server computing device, a personal computer, a handheld computer, a communications device such as a mobile telephone or smartphone, a node in a data storage network, a sensor or measurement device such as an embedded Internet-of-Things controller, or another form of information device with computing functionality. Computing devices may include both physical "bare metal" devices and virtual computing devices that are executed within a virtualisation platform upon a physical device. For example, a computer network may have hundreds of computing devices that comprise an operating system that are run as virtual devices within a single server computing device, wherein each virtual computing device has an Internet Protocol address and appears as a separable device upon the network. Mixtures of computing device types are common, e.g. "thin" client terminals may be used to remotely access a server that runs a virtualised client device instance.

A network of computing devices may be connected, as so-called "client" computing devices, to one or more server computing devices in a network computer system. The server computing device may provide services, such as electronic mail, file storage, and application functions. Colloquial reference to electronic services being provided "in the cloud", typically refers to the access of a server computing device by one or more client computing devices over one or more networks. A server computing device, acting as a server for one set of services, may comprise a client computing device for another set of services. For example, the term "client computing device" as used with reference to the examples herein, refers to clients with respect to an inventory service; as such, a client computing device for the inventory service may comprise a server computing device for a different service, e.g. comprise a file or web server.

Certain examples described herein relate to an inventory of files across a network. The extent of the "network" may be flexibly defined, e.g. as a set of Internet Protocol addresses that are assigned to a particular entity or organisation. The network may comprise a heterogenous set of network equipment installed at different geographical sites. The term "file" refers to a discrete collection of electronic data. In modern computer systems, "files" are presented as discrete items using a file system, which may be implemented by an operating system of the client computing device. In many operating systems, data deemed to be within a file is stored as a one-dimensional array of binary data, typically bytes (e.g. 8 bits). A file may be stored within persistent data storage that is communicatively coupled to a client computing device.

In certain examples, an inventory of at least files comprising executable code may be determined. A file comprising executable code may comprise an executable file, e.g. a file comprising encoded instructions that cause a processor of an executing client computing device to perform a task according to the instructions. The instructions may be "machine code" for processing by a central processing unit (CPU) of a computer and are typically in binary or a related form. In other forms, the instructions may be in a computer script language for interpreting by software. Different operating systems may give executable program files different formats. For example, on Microsoft Windows® systems the Portable Executable (PE) format is used. This format is a data structure that is compatible with the Windows® operating system (OS) for executing the instructions comprised in an executable file. On OS X® and iOS® systems, the Mach-O format is used. Another example is the Executable and Linkable Format (ELF). Different operating systems may also label executable program files with a particular filename extension, for example on the Windows® OS executable program files are typically denoted by the .exe extension. In certain cases, an operating system may use a file that comprises executable code that is arranged to be shared by different executing processes. These are referred to as shared libraries, and within the Windows® OS these are known as dynamic link library (DLL) files. A non-executable file may be seen as a file that is parsed by a separate executable program, e.g. a data file whose contents are accessible via the separate executable program. Certain examples described herein may be applied to both executable and non-executable files.

In certain cases, an inventory of executable software may be constructed. Executable software may form part of system software, e.g. an operating system, and/or one or more application programs. Executable software may comprise a collection of files comprising executable code. Modern computing systems typically have installed on them a variety of executable software. Operating systems may vary by manufacturer, version and level of patching. Application programs may have been chosen by a user or system manager to provide given functionality, e.g. locally or over the network. Executable software is typically stored on, or is accessible by, a computing device for running when desired, to provide its functionality. This software will generally originate from wide variety of sources, i.e. different developers and producers, and may be obtained by different means e.g. downloaded, or installed from disk or drive. In certain cases, an inventory of executable software may be expanded to non-executable files.

Certain examples described herein provide adaptations to a client computing device to obtain data associated with a state of the client computing device, such as data indicating a set of files stored on the client computing device. These files may comprise executable code and/or may comprise data files. Certain examples described herein also provide adaptations to a server computing device to send data to, and/or receive data from, the client computing device to construct an inventory. The inventory may comprise a database populated under the control of the server computing device, where records in the database indicate a state of the client computing device. In this case, the state of the client computing device may comprise an indication of files present on, or accessible to, the client computing device. The server computing device may communicate with a plurality of client computing devices to build up a state of the network, e.g. to determine metadata associated with software and files that are present on the network. The inventory may be used to identify client computing devices that require security patches and/or that contain executable code that may comprise a security risk. The inventory may have many uses, e.g. may enable users of the network to locate multiple copies of a particular file that are spread across the network. The inventory may be used to support versioning, compliance, data storage control, network routing (e.g. peer-to-peer file access), etc.

FIG. 1A shows an example of a network computer system 100 according to an example. The network computer system 100 comprises a plurality of client computing devices 110a, 110b and a server computing device 120 communicatively coupled to the plurality of client computing devices over one or more networks 105. For example, the one or more networks 105 may include one or more of: a local area network (LAN); a wide area network (WAN); and/or wireless equivalents thereof.

Each client computing device 110a, 110b includes a data storage device 111a, 111b, which comprises a plurality of files 112a, 112b. The data storage device 111a, 111b may comprise, for example, an electro-mechanical data storage device, such as a hard disk drive, and/or a solid state data storage device. Each client computing device 110a, 110b may comprise a plurality of data storage devices and the data storage devices may be of different types. The one or more data storage devices may be used to implement a physical storage layer, where one or more logical data volumes may be implemented using the physical storage layer.

Each client computing device 110a, 110b also includes a system agent 114a, 114b. The system agent 114a, 114b may comprise computer program code that is processed by one or more processors of the client computing device 110a, 110b. The system agent may operate at a kernel level. The kernel level may be a privileged level of operation, e.g. a similar level to that used by functions of an operating system of the client computing device 110a, 110b. The operating system may control the execution of one or more application programs as well as hardware resources of the computing device. Although, in FIG. 1A the client computing devices 110a, 110b are shown as physical entities, in certain cases they may comprise virtual devices that are running on a physical computing device. In this case, the operating system may not have knowledge of the virtualisation, e.g. it may operate as if it is installed upon a physical device rather than upon a virtualisation of the physical device.

In the present example, each system agent 114a, 114b is configured to apply a hash function to binary data read from the plurality of files 112a, 122b to generate a set of data signatures. Each data signature in the set of data signatures may comprise a characterisation of the binary data, e.g. a representation of the binary data having a size that is less than the size of the binary data. The hash function may comprise a one-way function that generates a code for each particular set of binary data, e.g. a code that is dependent on the bit values of the binary data. The code may comprise a fixed-length binary integer that may be represented as an alpha-numeric string, e.g. representing a hexadecimal number. The code may be unique for each particular set of binary data, and/or a particular threshold level of collisions may be defined.

Returning to FIG. 1A, in the present example, the server computing device 120 comprises a first data interface 121 and a second data interface 122. These interfaces may comprise one or more communication interfaces, e.g. computer program code that manages communications over one or more physical connections. The first data interface 121 is configured to access a set of exemplar data signatures 125. The set of exemplar data signatures 125 may result from a scan of one or more exemplar computing devices, e.g. each data signature in the set of exemplar data signatures 125 may be generated by applying a hash function in a similar manner to the system agent 114a, 114b. The one or more exemplar computing devices may comprise a test device, e.g. an example master computing device that is deemed representative of a particular client computing device configuration. The exemplar computing device may be based on a given "master" disk image file, e.g. a disk image file used to perform a "clean" installation to create and/or configure a new client computing device. In one case, an exemplar computing device may be generated as a virtual computing device by the server computing device 120. The set of exemplar data signatures 125 may be seen to represent an expected or "typical" set of files for a client computing device, e.g. for at least one predefined client computing device type and/or configuration.

The second data interface 122 is configured to access a state database 130. In one case, each record in a set of state records 135 in the state database 130 identifies one of the plurality of client computing devices 110a, 110b and a data signature. Hence, the state records 135 may be seen to indicate the presence of one or more files across the network computer system 100. For example, a record in the state database 130 may comprise a unique identifier for a client computing device and an alpha-numeric code representing the data signature. The unique identifier may comprise one or more of an Internet Protocol (IP) address (e.g. either version 4 or 6), a Media Access Control (MAC) address, and a Basic Input-Output System (BIOS) identifier (e.g. a number or alpha-numeric code stored within solid state memory on a motherboard of the client computing device). The alpha-numeric code may comprise a fixed-length file hash. In other cases, the state database 130 may alternatively store primary key values associated with the client computing devices and the data signatures, e.g. where actual values for the respective identifiers may be determined based on a look-up operation. In these cases, a list of files stored upon a client computing device may be obtained from the state database 130 by filtering records based on a particular device identifier in one column of the database.

In the example of FIG. 1A, each client computing device 110a, 110b is configured to receive the set of exemplar data signatures 125 and compare this set with the set of data signatures generated by the system agent 114a, 114b. The comparison may comprise determining whether an alpha-numeric code for each of the set of exemplar data signatures 125 is present in a list of generated codes. The data signatures may be represented as numbers or strings and may be compared using known number and/or string comparison functions. The comparison may be optimised such that two one-dimensional arrays may be compared and entries that are present in both arrays indicated by a binary value (e.g. using logical AND to indicate presence within both arrays). Each client computing device 110a, 110b then transmits data to the server computing device 120 based on the comparison. The data transmitted from each client computing device 110a, 110b may comprise a state bitmap that indicates matches between the set of exemplar data signatures 125 and the set of data signatures generated by the system agent 114a, 114b on the respective client computing device 110a, 110b. The state bitmap is so-called as it comprises a set of bits having a value of 0 or 1 indicating a match. The state bitmap may comprise a one- or multi-dimensional bitmap. In one case, the state bitmap may comprise a sequence of bits based on the order of the set of exemplar data signatures 125, where a value of 1 indicates that a file associated with a particular data signature is deemed to be present on the client computing device since a matching data signature has also been locally generated. The data signatures themselves may not form part of the state bitmap to reduce the amount of data transferred between the client computing devices 110a, 110b and the server computing device 120. The state bitmap may be compressed to further reduce the size of the transmitted data.

The server computing device 120 is configured to obtain a set of state bitmaps from data received from the plurality of client computing devices 110a, 110b. For example, the server computing device 120 may receive the data transmitted from each client computing device 110a, 110b over the network 105. In one case, the server computing device 120 may receive several compressed state bitmaps, corresponding respectively to the plurality of client computing devices 110a, 110b, and decompress these to obtain the set of state bitmaps. The server computing device 120 can then use the set of state bitmaps to update the set of state records 135 in the state database 130. For example, if an nth data signature in the set of exemplar data signatures is matched with a generated data signature on a client computing device, the nth bit of the state bitmap may have a value of 1, and this value can be used to add a record to the state database 130, e.g. by adding the identifier of the client computing device and an identifier corresponding to the nth data signature.

Hence, in the example of FIG. 1A, an inventory of the network 105, i.e. files stored within client computing devices 110a, 110b, is obtained by the server computing device 120. The amount of storage for the inventory is reduced by using an efficient record data structure. The amount of data that is transmitted over the network 105 is also reduced, e.g. down to a set of fixed length data signatures and a compressible binary array.

In certain examples, the system agent 114*a*, 114*b* may be adapted to use a file-system data file 116*a*, 116*b* to determine a location of the binary data that is used to generate the data signatures. This may provide further advantages for particular configurations. For example, the system agent 114*a*, 114*b* may use a file-system data file 116*a*, 116*b* when running in conjunction with certain operating systems. In FIG. 1A, the data storage device 111*a*, 111*b* also stores the file-system data file 116*a*, 116*b*. The file-system data file 116*a*, 116*b* may comprise a database that stores information about files and directories on a file system volume, the file system volume being implemented upon the data storage device 111*a*, 111*b*. The file-system data file 116*a*, 116*b* may be unique to the file system that is implemented upon the data storage device 111*a*, 111*b*, e.g. by an operating system or another system level module. There may be at least one record for each file and directory on the file system volume. Each record in the file-system data file may contain attributes that instruct the operating system on how to handle the file or directory associated with the record. For example, detailed information about a file or directory such as the type, size, date/time of creation, date/time of most recent modification, and author identity may either be stored directly in one or more entries of the file-system data file 116*a*, 116*b*, or externally to the file-system data file 116*a*, 116*b* but described or "pointed to" by the one or more entries of said file. An example of a file-system data file may be the master file table (MFT) in a New Technology File System (NTFS) e.g. for a Microsoft Windows® OS. In such cases, the MFT may contain records for each file and directory on the NTFS logical volume. For a hierarchical file system, such as HFS or HFS Plus, and/or Apple File Systems (APFS), e.g. as used by Macintosh® operating systems such as Mac OS X® and macOS®, the catalogue file may correspond to the file-system data file.

Where a file-system data file 116*a*, 116*b* is used, the system agent 114*a*, 114*b* may be configured to parse the file-system data file 116*a*, 116*b* to obtain data locations for the plurality of files 112*a*, 112*b*. For example, the plurality of files 112*a*, 112*b* may be stored at respective data locations of the data storage device 111*a*, 111*b*. The data locations may be represented, e.g. as addresses, in the file-system data file 116*a*, 116*b*, for example. The system agent 114*a*, 114*b* is configured to generate a set of data signatures from binary data located at the obtained data locations. This may be quicker than scanning a data volume for files and then retrieving data locations based on information stored within the file (e.g. within a file header or the like).

In examples where the file-system data file comprises an MFT, e.g. on an NTFS volume of storage, a fast_file_find function may be implemented to collect metadata directly by parsing the MFT and traversing data runs by block reading the at least one storage volume directly. Parsing the file-system data file 116*a*, 116*b* to obtain data locations for the plurality of files 112*a*, 112*b* may reduce the overall time required to retrieve and store the data associated with the plurality of files 112*a*, 112*b* on the client computing devices 110*a*, 110*b*, e.g. may increase the speed at which a set of data signatures may be generated on a client computing device. Using this method may additionally reduce any noticeable adverse effects in performance of the client computing devices 110*a*, 110*b*. For example, processor usage at the client computing devices 110*a*, 110*b* may not be significantly increased and normal system usage may be negligibly affected by the increase in data storage read rates.

In certain examples, the set of exemplar data signatures may be split into a plurality of sets (or subsets) of data signatures. In these cases, different sets of exemplar data signatures may relate to different expected device configurations. For example, each operating system family may have its own set of exemplar data signatures. Each set of exemplar data signatures may be selectively communicated to the client computing devices, e.g. based on a known build of the client computing device. Alternatively, multiple sets of exemplar data signatures may be sent to a given client computing device; e.g. if a client computing device does not have an operating system that belongs to a particular operating system family, the state bitmap may be mostly or wholly '0' entries, which can be efficiently compressed, e.g. using run-length encoding.

In examples, different approaches may be applied to communicate the set of exemplar data signatures 125 to the client computing devices 110*a*, 110*b*. In certain implementations, the set of exemplar data signatures 125 may be communicated using peer-to-peer approaches. For example, the set of exemplar data signatures 125 may be transmitted to a selected one of the plurality of client computing devices 110*a*, 110*b* and other ones of the plurality of client computing devices 110*a*, 110*b* may obtain the set of exemplar data signatures 125 from the selected one of the plurality of client computing devices 110*a*, 110*b*. This process may be repeated, or performed independently, for each set of exemplar data signatures.

For example, system agent 114*a*, 114*b* or another system agent may be used to designate one or more of the client computing devices 110*a*, 110*b*, e.g. in a subnet of the network 105, to act as a "download master", e.g. as a peer-to-peer hub for download of the set of exemplar data signatures 125. The designated one or more client computing devices 110*a*, 110*b* may obtain and store the set of exemplar data signatures 125 (e.g. and other packages such as software packages) for supply to other computing devices in the respective subnet. This can avoid downloading the set of exemplar data signatures 125 across the network 105 to each of the client computing devices 110*a*, 110*b* in each subnet, thereby reducing network traffic.

In the above peer-to-peer approaches, a client computing device 110*a*, 110*b* requesting the set of exemplar data signatures 125 (e.g. or another package) may initiate an election, e.g. within a network and/or subnet, to determine which other client computing device 110*a*, 110*b* can provide the set of exemplar data signatures 125. A client computing device 110*a*, 110*b* having the set of exemplar data signatures 125 may be elected as the download master and the requesting client computing device 110*a*, 110*b* may download the package therefrom. In one case, NOMAD® from 1E Limited may be used to implement the peer-to-peer functionality.

Figure 1B:
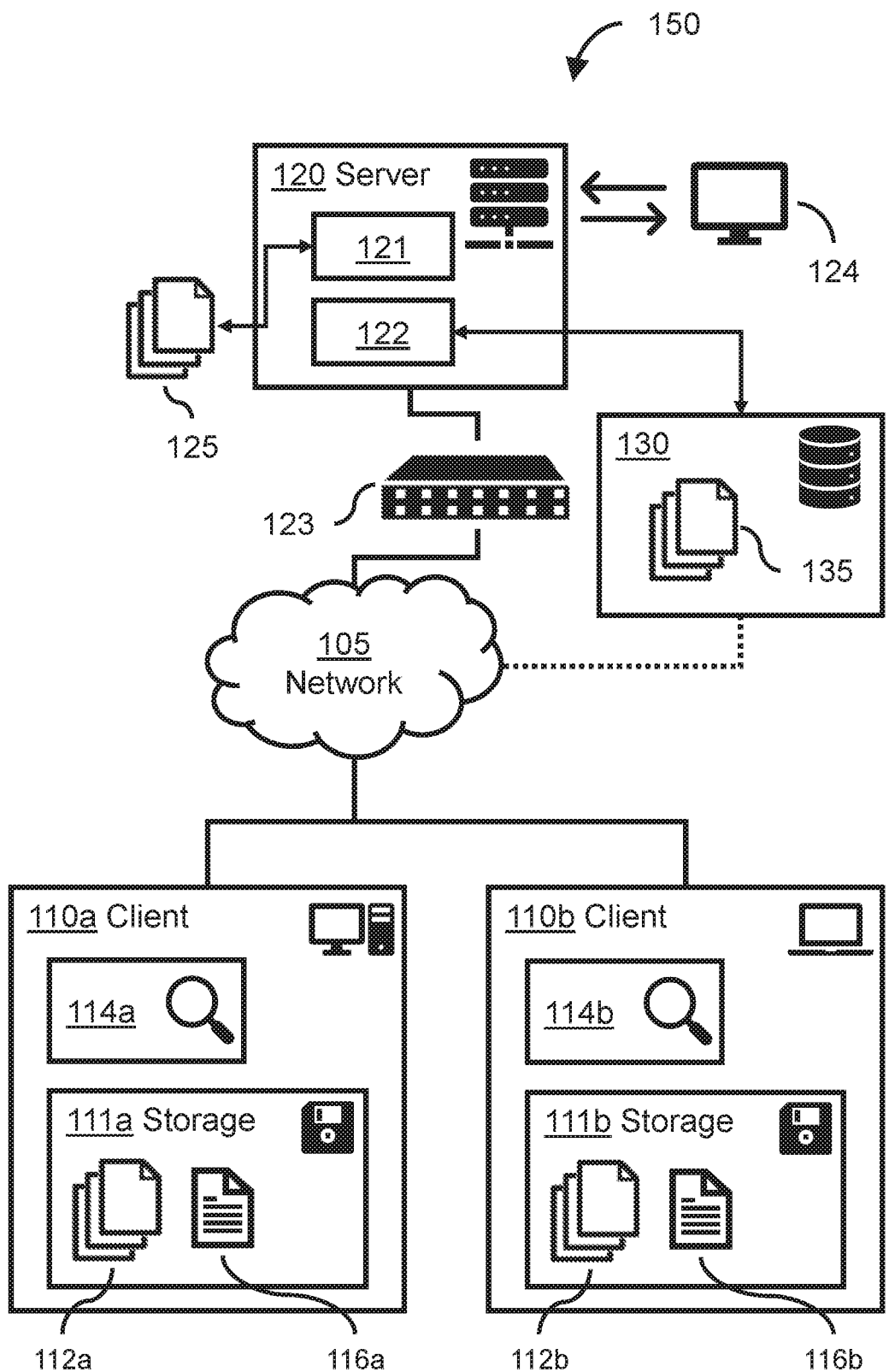

FIG. 1B shows another example of a network computer system 150. The network computer system 150 may be seen as a variation of the network computer system 100 of FIG. 1A, where similar components are referenced using corresponding reference numerals.

In the network computer system 150 of FIG. 1B, the server computing device 120 is connected to a network switch 123. The switch 123 may connect network devices together, electrically and logically, by using data packet switching to receive, process and forward data over the computer network to the intended network device(s). In one case, the switch 123 may comprise a transport layer switch for forming persistent or long-term transport protocol connections with the client computing devices 110*a*, 110*b*. The switch 123 may forward data only to a specific network device (or specific multiple network devices) e.g. in contrast to a network hub (connected to the server computing device 120 in an alternative example) which broadcasts the same data to each connected network device. Each network device connected to the switch 123 may be identified using a Media Access Control (MAC) address, a unique identifier allowing the switch 123 to regulate and direct the flow of network traffic. In one case, the switch 123 may control a number of Transport Control Protocol (TCP) or User Datagram Protocol (UDP) connections between the switch 123 and each of a set of client computing devices 110a, 110b, e.g. each client computing device 110a, 110b may have a transport protocol socket for the receipt of data and commands from the switch 123, and the switch 123 may have a corresponding transport protocol socket for the receipt of data and commands from each of the client computing device 110a, 110b. In certain cases, the switch 123 may be configured to exchange packets of data over the transport layer connections.

In the network computer system 150, the switch 123 may be used by the server computing device 120 to communicate with the client computing devices 110a, 110b. For examples, the switch 123 may be used to transmit the set of exemplar data signatures 125 to the client computing devices 110a, 110b as well as requests to obtain a state of the client computing devices 110a, 110b. The switch 123 may also then receive the state bitmaps from the client computing devices 110a, 110b. In one case, the switch 123 may forward data onto the server computing device 120; in another case, the switch 123 may be controlled to execute certain functions without passing data to the server computing device 120, e.g. the switch 123 may update the state database 130 directly under the control of the server computing device 120, e.g. by batching data received from the client computing devices 110a, 110b and performing a data update operation on the state database 130.

Figure 2:
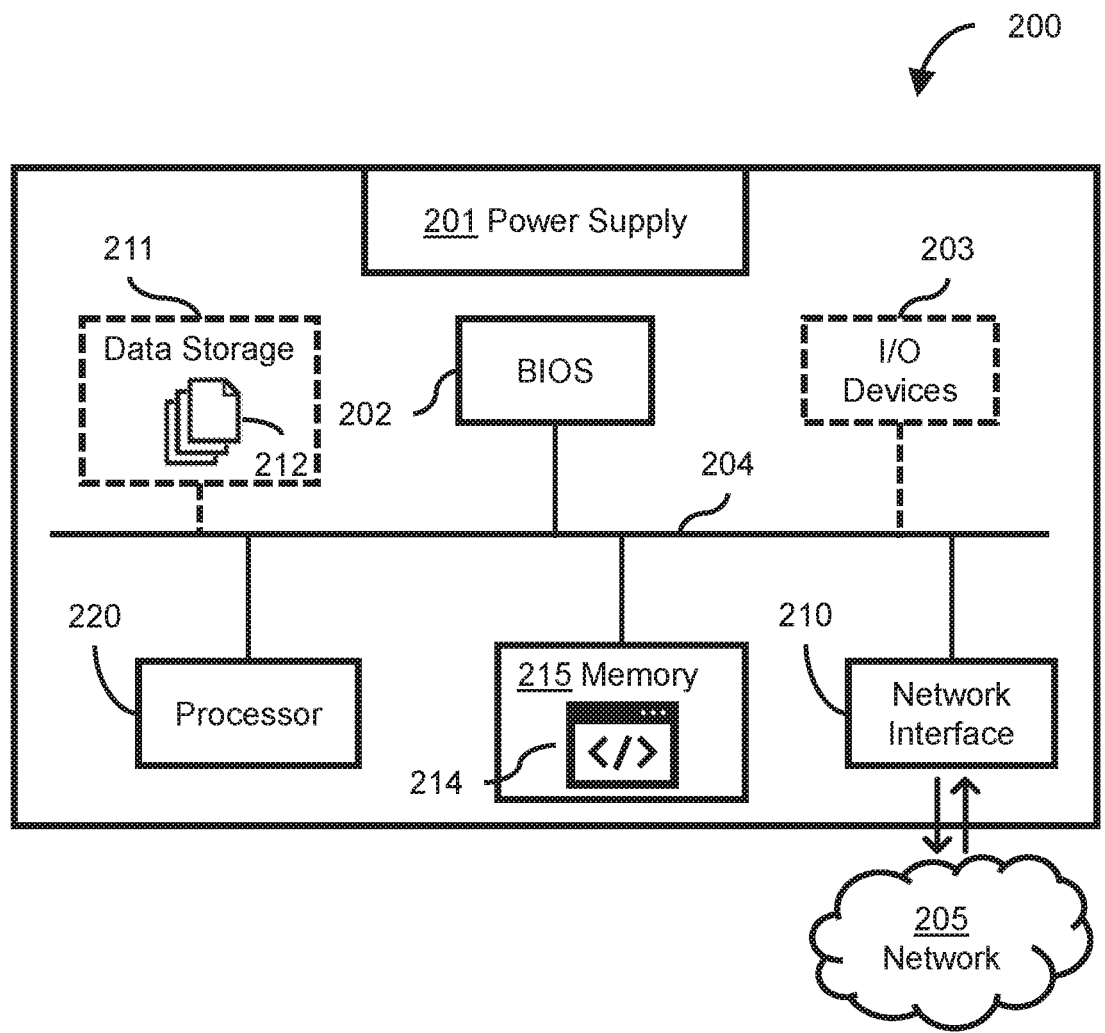
FIG. 2 is a schematic diagram showing the components of a client computing device according to an example.

In the network computer system 150 of FIG. 1B, the server computing device 120 of FIG. 2 is also controllable by a terminal 124, e.g. a user terminal, connected to the server 120 by a communication channel. An end user may thus command the server computing device 120, using the terminal 124, to provide instructions to one or more computing devices 110 connected to the network 105, via the switch 123. Furthermore, response data from the networked device 110 may be received at the terminal 124, via the server computing device 120 and the switch 123. In other examples, the server computing device 120 may be accessed and operated by means other than a user terminal 124, such as by another (remote) server over a network connection.

FIG. 2 shows an example of a client computing device 200, for example corresponding to one of the plurality of computing devices 110a, 110b in the network computer system 100, 150 of FIGS. 1A, 1B. The client computing device 200 comprises a network interface 210 to communicatively couple the client computing device 200 to at least one network 205, e.g. the at least one network 105 described in examples above with reference to FIGS. 1A, 1B. The client computing device 200 also comprises at least one volume of data storage 211, e.g. corresponding to the data storage 111a, 111b described in examples above with reference to FIGS. 1A, 1B. The at least one volume of data storage 211 may be implemented upon an auxiliary storage device such as a hard disk drive or solid-state drive. In one case, the volume of data storage may comprise a logic volume that is implemented upon one or more physical volumes associated with one or more physical storage devices. In some examples, the at least one volume of data storage 211 may be implemented using an internal component of the client computing device 200. In other examples, the at least one volume of data storage 211 may be implemented using an external storage device that is accessible to the client computing device 200, for example removable media such as a USB flash drive or external hard disk drive. The at least one volume of data storage 211 comprises a plurality of files 212, e.g. which correspond to the plurality of files 112a, 112b described in examples above.

The client computing device 200 also has a memory 215 comprising, in use, computer program code 214 for a system agent, e.g. the system agent 114a, 114b described in other examples. The memory 215 may be a main memory of the client computing device 200, for example. In examples, the memory 215 comprises random access memory (RAM) and/or read only memory (ROM). The client computing device 200 also has at least one processor 220, e.g. a central processing unit (CPU), configured to execute the computer program code 214 for the system agent. In use, computer program code 214 for the system agent may be retrieved from a persistent data storage device, e.g. from the at least one volume of data storage 211 or another logical volume and loaded into memory for execution by the at least one processor 220. In one case, the system agent may be implemented as a thread upon the at least one processor 220. The system agent may have authorisation from the operating system to access restricted resources, e.g. to access binary data associated with the at least one volume of data storage 211 and/or system files that are used to implement a file system. The system agent may also be authorised to communicate over the network interface 210, e.g. with the server computing device 120 or the switch 123 of FIGS. 1A and 1B. In certain cases, the system agent may be run by a system user, e.g. representing the operating system and/or an authorised system process.

In addition to the components described above, the computing device 200 may include a power supply 201, a Basic Input/Output System (BIOS) 202, one or more buses 204, and input/output (I/O) devices 203. The I/O devices 203 may include human interface devices such as a keyboard and a pointing device. The BIOS 202 may comprise low-level computer program code to boot the client computing device that is stored in a Read Only Memory (ROM). The computing device 200 may also have other components, for example a display driver coupled to a display device. The components may interact with each other via the bus(es) 204, BIOS 202, and I/O devices 203.

The components shown in FIG. 2 are for example only, e.g. corresponding to a typical architecture for a client computing device. However, client computing devices may have a wide variety of forms, architectures and components. Client computing devices may have different sets of hardware components and operating systems. The example methods described herein are adaptable to such a large array of devices.

In use, e.g. during execution of the computer program code 214, the system agent may be configured to receive, at the network interface 210, a request to obtain a state of the client computing device 200. The request may originate from a server computing device that the client computing device 200 is connected to over the network 205. This may comprise the server computing device 120 or the switch 123 in FIGS. 1A and 1B. In the latter case, the network interface 210 may comprise a transport layer socket to send and receive small packets of data over the network 205 (e.g. of a size defined in bytes or kilobytes that may be less than 1 MB). The request to obtain the state of the client computing device 200 may relate to a request to determine which files are present on the client computing device 200, for example. The system agent is also configured to receive, at the network interface 210 of the client computing device 200, a set of exemplar data signatures. The set of exemplar data signatures may be represented in a data structure, e.g. a hash table. In certain examples, an explicit request to obtain a state of the client computing device 200 may be received; in other examples, the state of the client computing device 200 may be determined at periodic intervals, e.g. in response to a scheduled process or scan of the client computing device 200.

On execution of the computer program code 214, and, for example, in response to the request received at the network interface 210, the system agent applies a hash function to binary data read from the plurality of files 212 stored in the at least one volume of data storage 211. As described above, in certain cases, the at least one volume of data storage 211 may comprise a file-system data file, e.g. the file-system data file 116a, 116b according to previous examples, for use in determining the locations of the binary data for each file. For example, the hash function may map the binary data, which may be of arbitrary size, onto data of a fixed size. In other cases, the system agent may perform a scan of the at least one volume of data storage 211 to locate a set of files and access each file in term to determine a location of data associated with the file, e.g. binary data representing the file contents. The system agent applies the hash function to generate a set of data signatures. The hash function may be a fast (e.g. hardware accelerated) hash function available as an operating system service and/or a custom hash function implementation. Applying a hash function may comprise computing a cryptographic function on a set of bit values that represent a given file. The bit values may be provided in a number of different formats, e.g. as hexadecimal data, as a sequence of '0' and '1' values, as a sequence of bytes etc. The data signatures may comprise respective file hashes (or "hash values", "hash codes", "digests"). In some cases, the data signatures may comprise derivatives of such file hashes. Each data signature in the set of data signatures may uniquely correspond to a respective file in the plurality of files 212. For example, a given data signature in the set of data signatures may uniquely identify a corresponding file in the plurality of files 212. The generated data signatures and the received exemplar data signatures may then be compared as discussed above.

Figures 5A, 5B, 5C:
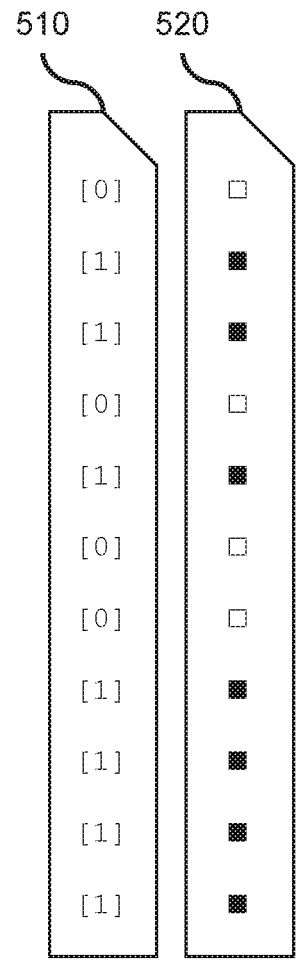

FIG. 5A shows an example set of exemplar data signatures 500 that may be received at the client computing device 200. In this example, the exemplar data signatures are MD5 hashes, however other hash functions may be used in other cases to generate the exemplar data signatures. Each data signature may be of a fixed length, e.g. 128-bit or 256-bit in length, depending on the number of different files that are expected to be present on the network (e.g. 128 bits would allow for over $3.40 \times 10^{38}$ unique files across a network). In FIG. 5A, each data signature is shown as an alpha-numeric code, representing a hexadecimal value, the hexadecimal value representing a 128-bit integer value. The amount of data transmitted to the client computing devices may be controlled by controlling the size of the data signatures. The set of exemplar data signatures may be provided as a one-dimensional array, which may be streamed as a bit stream to the client computing device 200 and/or packaged in one or more data packets. In certain examples, each exemplar data signature in the set of exemplar data signatures may contain additional data, e.g. additional metadata associated with the data signature; however, this may be minimised or avoided to reduce the amount of data that is communicated over the one or more networks 105.

A set of exemplar data signatures may exploit a redundancy in the number of files that are common to endpoints in the network. In certain cases, multiple sets of exemplar data signatures may be provided. In one case, a group of client computing devices may share many common files, e.g. such files may be components of a given operating system and there may be many endpoints running the same operating system, or the files may comprise shared libraries for common application software which is used across the network. Indeed, even different versions of an operating system, or different operating systems, may share a common set of files, e.g. representing common device drivers and/or a widely used communications stack. These common files may be represented within a given set of exemplar data signatures.

FIG. 5B shows an example of a state bitmap 510 and a visualisation 520 of the state bitmap. The state bitmap 510 (which may also be referred to as a "bit array" or "bitmap index") may be generated by a system agent by comparing a set of generated data signatures with a received set of exemplar data signatures. The state bitmap 510 indicates, for each exemplar data signature in the set of exemplar data signatures 500, whether the exemplar data signature is present or absent in the set of generated data signatures. For example, the first exemplar data signature fc64f854b1bc6ca92fe37719011b0247 in the set of exemplar data signatures 500 shown in FIG. 5A is indicated to be absent in the set of generated data signatures by a 'zero' entry in the state bitmap 510 shown in FIG. 5B. The second exemplar data signature abcc24a627f95a8886051985c6eea5a8 in the set of exemplar data signatures 500, however, is indicated to be present in the set of generated data signatures by a 'one' entry in the state bitmap 510. The visualisation 520 shows how the data 510 may be comparable to a binary "image" bitmap, where each pixel is either white (0) or black (1). The state bitmap may be seen to map from the domain of data signatures to bits. It should be noted that a value of '1' for presence and '0' for absence is set by convention and that a value of '0' for presence and '1' for absence could alternatively be used. The format of the state bitmap may be determined based on a statistical analysis of an exemplar computing device, compression factors and/or the form of network communications across the network.

FIG. 5C shows state data 530 comprising a compressed version of the state bitmap 510 shown in FIG. 5B. In this example, the state bitmap is compressed using run-length encoding; in other examples, different compression algorithms or different varieties of run-length encoding may be used. The state data 530 in the present example is in the form [symbol_run_length, symbol, symbol_run_length, symbol . . . ]; hence, in FIG. 5C, the state data 530 denotes one '0' value, two '1' values, one '0' value, one '1' value, two '0' values and four '1' values. Run-length encoding and the like may be particularly effective for large file sets that are part of a common (i.e. shared) library, e.g. a common set of display functions; in this case, there may be long sequences of '1's or '0's indicating the presence or absence of the common library, such that the presence of many files may be indicated with just a few bytes.

In some cases, state data may comprise the state bitmap as a payload and may also comprise metadata. The state data may be transmitted over the network 205 via the network interface 210 of FIG. 2. In examples, the state data file is transmitted back to the origin of the initial request to obtain the state of the client computing device 200, e.g. the server computing device that sent the request. The separate steps of using state bitmaps to map from the data signature domain to bits, and compressing the state bitmaps, can each contribute to reducing the amount of data to be transmitted from the client computing device 200 to the server over the network 205, thus reducing network traffic.

Figure 3A:
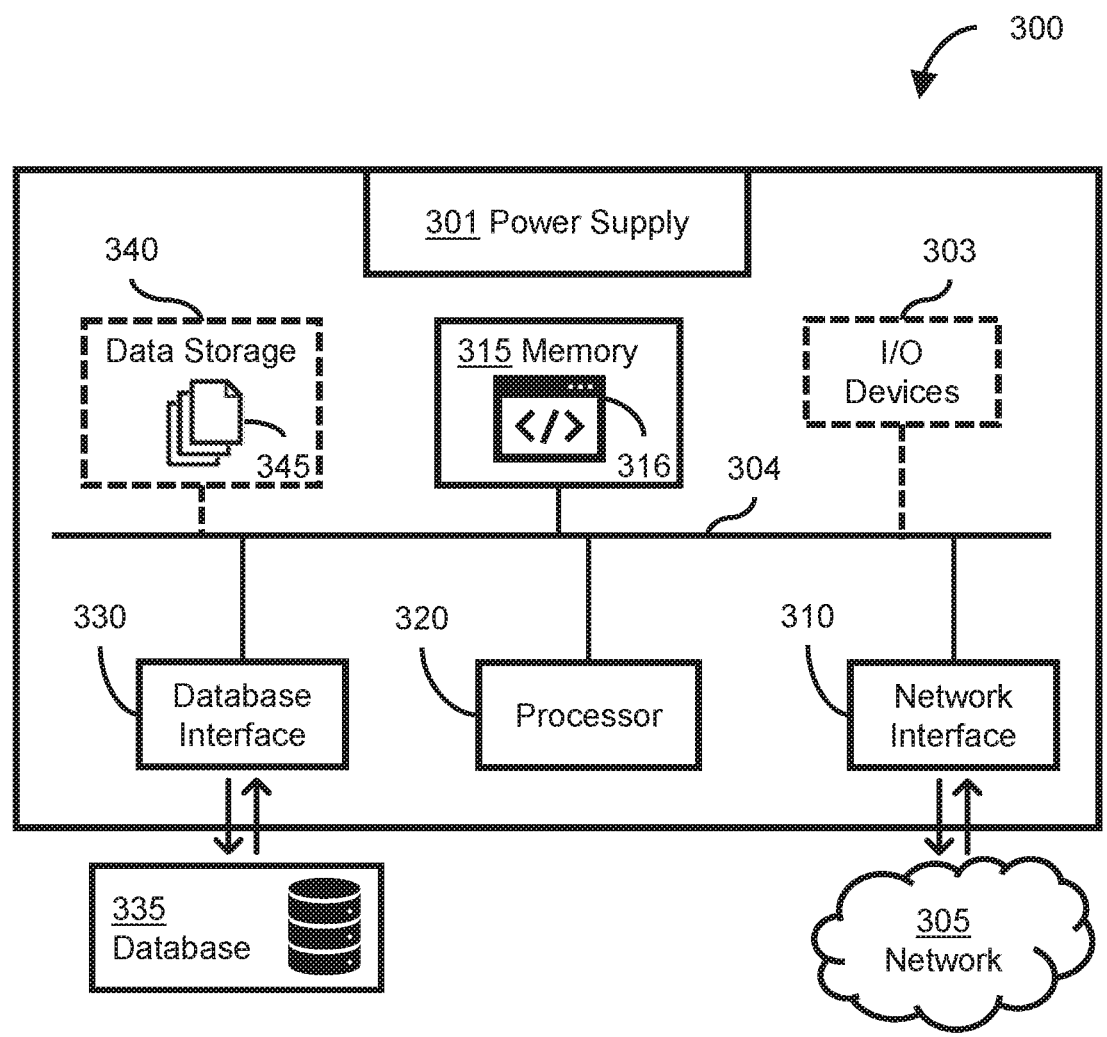
FIGS. 3A and 3B are schematic diagrams showing the components of a server computing device according to examples.

FIG. 3A shows an example of a server computing device 300, which may, for example, correspond to an implementation of the server computing device 120 described in examples above. The server computing device 300 of FIG. 3A may be used together with the client computing device 200 of FIG. 2, or with another form of computing device. The server computing device 300 comprises certain components that are similar to those of client computing device 200, e.g. the server computing device 300 comprises a power supply 301, I/O devices 303, one or more buses 304 via which the components of the server computing device 300 may interact, a network interface 310, memory 315, at least one processor 320, a database interface 330 and data storage 340.

The server computing device 300 uses the database interface 330 to access a database 335 representing a state of the network 305. The server 300 may be connected to the network 305, for example, via a network interface 310. The server computing device 300 has data storage 340 to store at least one set of exemplar data signatures 345 resulting from a scan of one or more exemplar computing devices. Each data signature in the set of exemplar data signatures 345 is generated by applying a hash function to binary data representing a file. For example, the MD5 message-digest function may be applied to the contents of the file in order to generate the data signature. The data signature corresponding to the file may comprise the output hash of the file contents, e.g. a "file hash". In some cases, the data signature may also include metadata in addition to the file hash. Other examples of hash functions include the Secure Hash Algorithm family of standards, e.g. SHA-3, and the RIPEMD (RIPE Message Digest) family of hash functions, e.g. RIPEMD-160.

In FIG. 3A, the memory 315, in use, comprises computer program code 316 for a network server. The computer program code 316 may be complementary to the computer program code 214 for the system agent in FIG. 2. The computer program code 316 may be persistently stored in data storage 340 or another data storage device. The network server may be considered to be an entity implemented in computer program code that controls an inventory service provided by the server computing device 300. In use, the at least one processor 320 (e.g. a CPU having one or more cores) is configured to execute the computer program code 316, stored in the memory 315, to implement the network server, e.g. as a thread or daemon.

Execution of the computer program code 316 causes the network server to instruct a transmission of the set of exemplar data signatures 345, stored in the data storage 340, to the computing devices over the network. This transmission may be performed as part of a state request or separate to the state request. In one case, the network server may be configured to instruct a transmission of a state request to one or more client computing devices coupled to a network. In one case, the set of exemplar data signatures 345 may be communicated directly from the server computing device 300 to the client computing device 200. In other cases, the set of exemplar data signatures 345 may be indirectly communicated directly to the client computing device 200, e.g. may be communicated by the switch 123 of FIG. 1B or made accessible at a network location (e.g. from a network accessible data storage device and/or a peer computing device).

After the set of exemplar data signatures 345 have been communicated to one or more client computing devices, the network server obtains state data communicated from these computing devices over the network. The state data may be similar to the state data 530 shown in FIG. 5C. In one case, the state data may be received in response to a state request transmitted to the client computing device, e.g. the state request may trigger the generation of the state data on the client computing device as described above. In other cases, the state data may be received asynchronously, e.g. once a particular process has completed on each client computing device. Transmission of the state data may be scheduled and may differ for each client computing device, e.g. to minimise network distribution. In one case, communication of state data may be scheduled for outside office hours, e.g. overnight at a particular geographic location. In the example of FIG. 3A, the state data may be received at the network interface 310 of the server computing device 300 from over the network 305.

The network server, based on execution of the computer program code 316, processes the state data files to extract state bitmaps for the computing devices. This may comprise decoding transmitted data, e.g. decoding any run-length encoding applied to generate the state data. The state bitmaps indicate a presence or absence of each of the set of exemplar data signatures 345, e.g. on a particular computing device of the one or more computing devices coupled to the network 305. For example, a state bitmap associated with a given computing device on the network 305 (e.g. a client device of the server computing device 300) may be indicative of a checklist of data signatures against the set of exemplar data signatures 345, with indications of the data signatures representative of files that are present on the client device, and indications of the data signatures representative of files that are absent on the client device.

The network server, based on execution of the computer program code 316, then updates data records for the database 335 using the state bitmaps. The data records indicate which files are present in each of the computing devices coupled to the network 305. The data records may thus represent the state of the network 305.

Figure 3B:
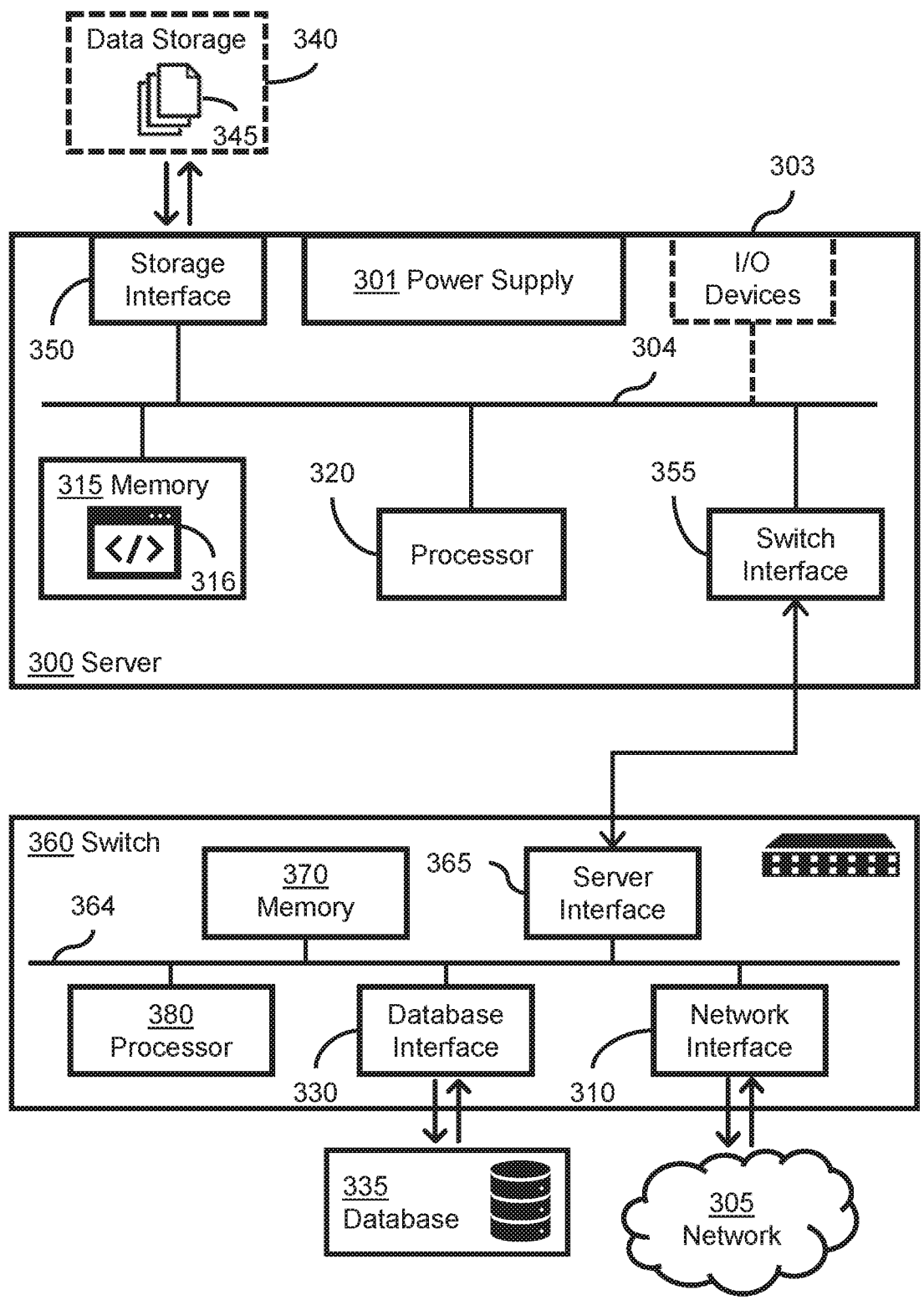

FIG. 3B shows another example of the server computing device 300 in which the database interface 330 and the network interface 310 are located at a switch 360, e.g. corresponding to the case described above with reference to FIG. 1B. The server computing device 300 comprises a switch interface 355 via which the server computing device 300 can communicate with the switch 360; the latter having a corresponding server interface 365 for communication with the server 300. The switch 360 may comprise its own memory 370 and processor 380, and may correspond to the switch 123 shown in FIG. 1B. The switch 360 may comprise a general-purpose computing device suitably programmed and/or dedicated network hardware where one or more functions are implemented via dedicated electronic circuitry. In FIG. 3B, the switch 360 includes its own bus 364 via which the components of the switch 360 may interact.

In the example of FIG. 3B, the processor 320 of the server computing device 300 can execute the computer program code 316 stored in the memory 315 of the server 300, as described above, to cause the network server to carry out its functions. These functions can utilise the switch 360. For example, the transmission of the state request to the client computing devices over the network 305 can be made via the network interface 310 at the switch 360. Similarly, the state data files may be received from the client computing devices over the network 305 at the network interface 310 of the switch 360.

In the example arrangement of the server computing device 300 shown in FIG. 3B, the network server may instruct the switch 360 to update the data records for the database 335 using received data. The update of the data records may be performed via the database interface 330 located at the switch 360. It should be noted that different arrangements of distributed functions between one or more server computing devices are also possible and FIGS. 3A and 3B are provided as suitable examples.

In the example of FIG. 3B, the data storage 340 storing the set of exemplar data signatures 345 is also external to the server computing device 300. Instead, the server 300 comprises a storage interface 350 to communicate with the data storage 340 and access the set of exemplar data signatures 345. In this case, the set of exemplar data signatures 345 may be obtained via, for example, an application programming interface call to a network service arranged to supply the set. As described, in other examples, the data storage 340 may be internal to the server device 300.

Figure 7A:
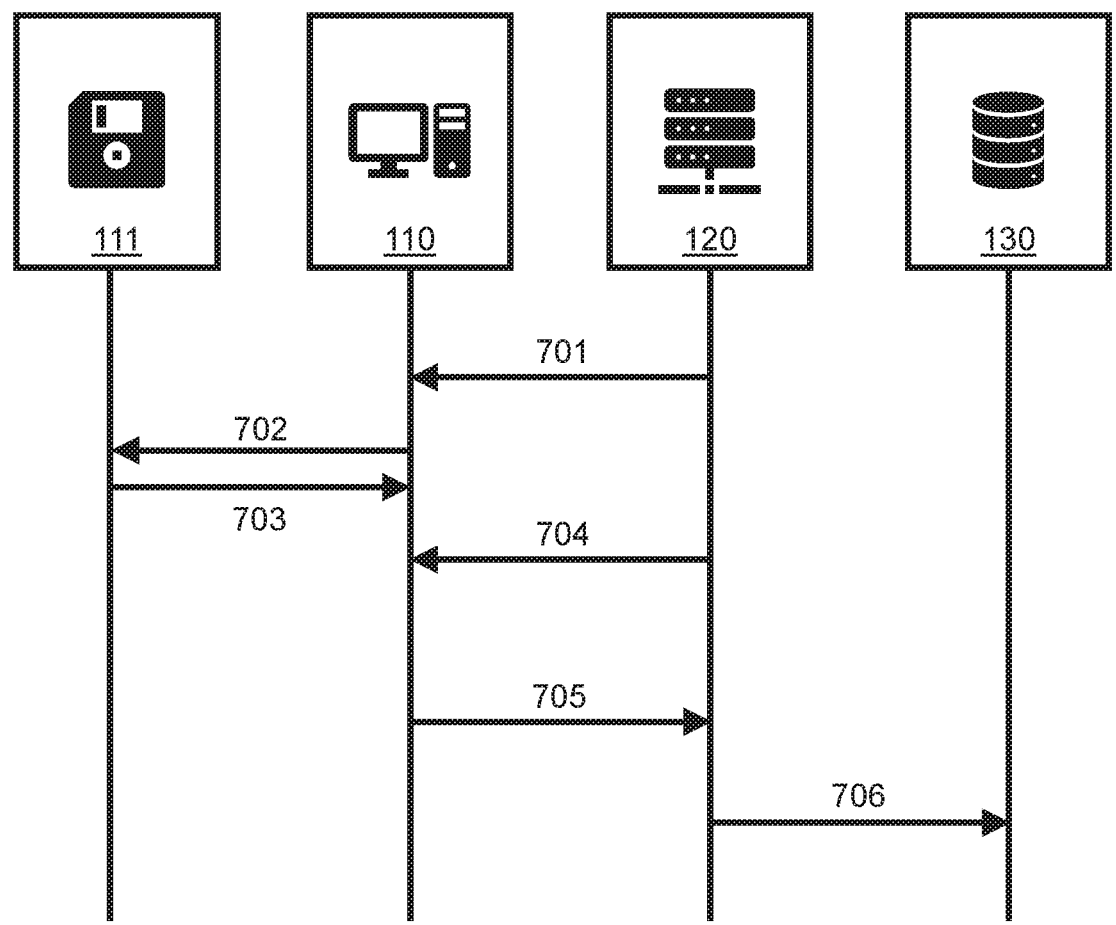
FIGS. 7A and 7B are schematic diagrams showing network traffic travelling between components of a network system according to examples.

FIG. 7A shows an example of network traffic travelling between the components of the network system 100 shown in FIG. 1 and described individually above. In an example, the server computing device 120 transmits (step 701) a state request to the client computing device 110 over the network. The server computing device 120 may transmit respective requests to each client computing device 110 connected to the network, for example, or may transmit a general state request to all client computing devices 110 connected to the network. The client computing device 110 is arranged to receive (as part of step 701) the request to obtain the state of the client computing device 110 transmitted over the network. In other examples, the state request may be omitted and replaced, for example, with a periodic process scheduled at the client computing device 110.

The client computing device 110 obtains (steps 702, 703) data signatures for a plurality of files that are stored on at least one volume of data storage 111 accessible to the client computing device 110. For example, the client computing device 110 may access the at least one volume of storage 111 via one or more data access requests sent to the at least one volume of data storage 111 (step 702) in order to obtain the data signatures from the data storage 111 (step 703). Obtaining the data signatures includes applying a hash function to binary data read from the plurality of files. For example, the binary data may be read from data storage locations in the at least one volume of data storage 111 that correspond to the plurality of files. Such reading of the binary data may be done as part of, or in response to, the one or more data access requests sent to the at least one volume of data storage 111. After retrieving the stored binary data, the client computing device 110 can apply the hash function thereto in order to generate the data signatures. For example, as described elsewhere, each data signature may comprise a file hash of the corresponding file. In some cases, the data signature may comprise other data, e.g. metadata, in addition to the actual file hash. The metadata may be extracted from a header of the file.

During a pre-processing operation, and/or while the client computing device 110 is generating a set of data signatures, the server computing device 120 obtains a set of exemplar data signatures resulting from a scan of one or more exemplar computing devices. The scan of the one or more exemplar computing devices may be performed during an initial configuration phase, e.g. as described in more detail below. Each data signature in the set of exemplar data signatures is generated by applying a hash function to binary data from a file in a set of files accessible to the one or more exemplar computing devices. The set of exemplar data signatures may thus be representative of the set of files accessible to the one or more exemplar computing devices.

In FIG. 7A, the server computing device 120 transmits (step 704) the set of exemplar data signatures to the client computing devices 110 over the network. Although steps 710 and 704 are shown as separate operations in FIG. 7A, in certain cases they may comprise a common network transmission (e.g. a state request may contain the set of exemplar data signatures within a request payload). The client computing device 110 receives (as part of step 704) the set of exemplar data signatures over the network.

A state bitmap is then generated at the client computing device 110 by comparing the generated data signatures with the set of exemplar data signatures. For example, the state bitmap generated at the client computing device 110 indicates a presence or absence of each data signature, in the set of exemplar data signatures, in the set of generated data signatures which represent the set of files accessible to the client computing device 110. In this way, the set of files accessible to the client computing device 110 on the network can be compared to the (exemplar) set of files accessible to an exemplar computing device, which may be configured in a particular way. This process may be performed in response to one or more of the request at step 701 and the set of exemplar data signatures sent at step 704, or may be performed asynchronously at a scheduled time, e.g. the data signatures may be generated at the client computing device 110 while a CPU is idle.

State data generated from the state bitmap is then transmitted (step 705) from the client computing device 110 over the network. The state data may be a compressed, or otherwise modified, version of the state bitmap generated at the client computing device 110, for example. The server computing device 120 receives (as part of step 705) the state data from each client computing device 110 over the network in response to the initial state request (step 701). The state data is then processed at the server computing device 120 to extract state bitmaps for each of the client computing devices 110. For example, such processing may be to reverse the modification applied to the state bitmaps, e.g. decompressing a compressed version of the set of state data files to extract the individual state data files corresponding to the client computing devices 110 on the network.

The server computing device 120 uses the state bitmaps to update (step 706) a database 130 representing the state of the network. The database 130 comprises data records indicating which files are present in each of the computing devices 100 on the network, as described elsewhere.

Figure 6:
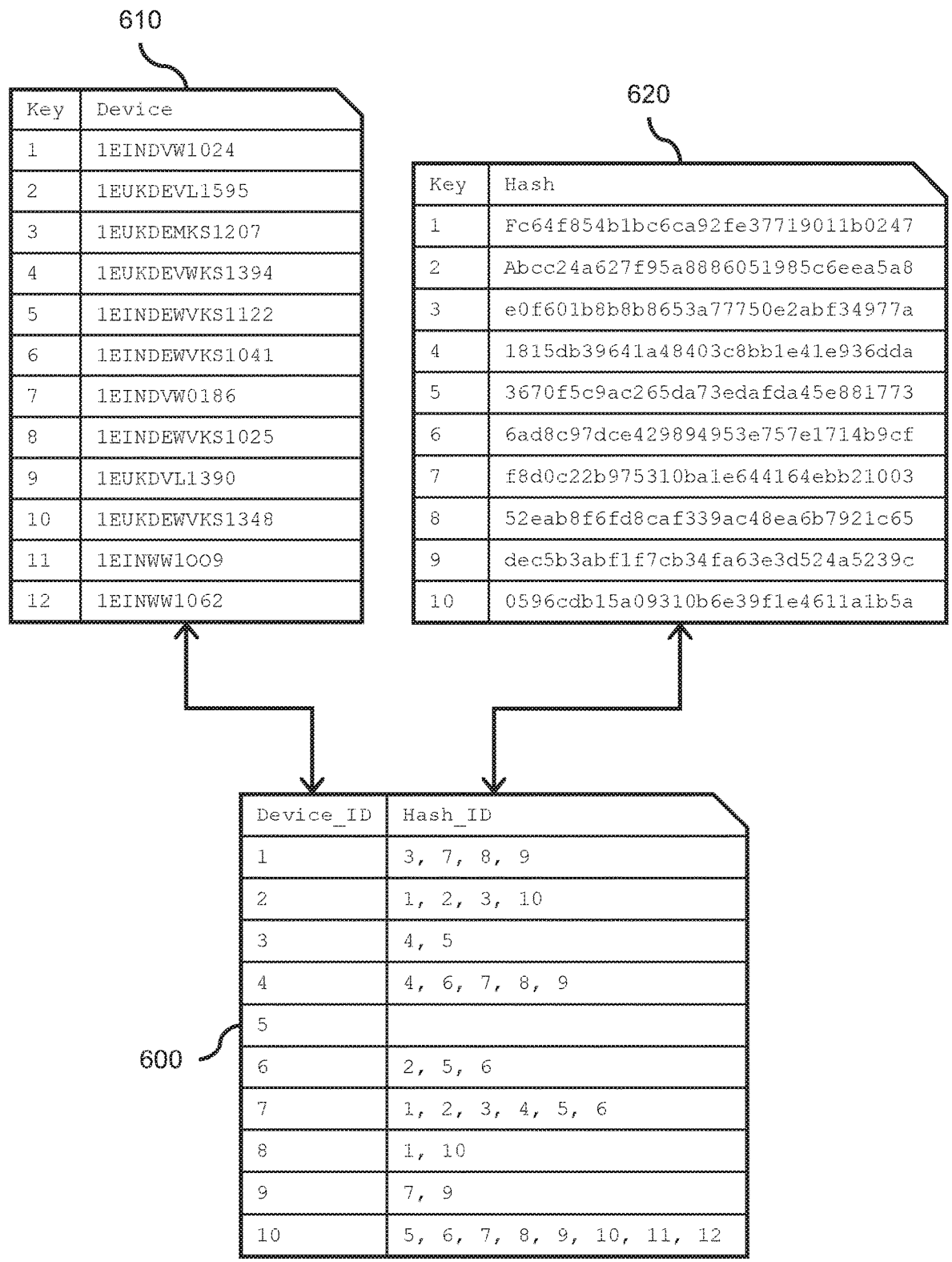
FIG. 6 is a schematic diagram showing database records according to an example.

FIG. 6 shows an example of one form of database records 600 that may implement an inventory. It should be noted that the records of FIG. 6 are provided for example only and may differ in practical implementations.

In the example of FIG. 6, a set of computing devices are indexed as a set of device records 610 and a set of data signatures are indexed as a set of data signature records 620. The device records 610 in the example of FIG. 6 comprises a lookup table matching a device identifier (Device) to indexes (Key), where the indexes may comprise a primary key for the device records 610. The device records 610 may comprise a link table where the device identifier is a primary key in a larger device record, or each device record 610 itself may comprise additional fields relating to a particular device (such as model, manufacturer, operating system, hardware specifications, network addresses etc.). In the example of FIG. 6, the data signatures comprise file hashes, and the data signature records 620 comprise a hash table where each file hash is assigned a Key index. Again, the data signature records 620 may be used as a link table, where the hash or the key field is used to identify a given file in a larger metadata record, or the data signature records 620 may have additional files associated with a file that are not shown in FIG. 6.

In one case, the data signature records 620 may be used to link to a record of metadata associated with each file. These files may be executable and dynamic link library (DLL) files. In certain cases, the metadata may be obtained using a versioninfo resource block embedded in each file. This may be obtained from a locally accessible exemplar computing device, e.g. as opposed to having each client computing device report this information over the network. Not all files necessarily contain such resource data, but a significant majority typically do. The metadata which can be obtained from this source may comprise one or more of an original file name, internal name, company name (e.g. publisher), file description, product name, file version, and product version associated with a given file. This metadata may be augmented with other information about the file, e.g. a file size and/or file name (including a path on the file system).

Returning to FIG. 6, the database records 600 thus form another type of link table by linking a particular index from the device records 610 (stored in Device_ID) with one or more indexes from the data signature records 620 (stored in Hash_ID). For ease of explanation FIG. 6 shows multiple hash indexes stored for each device index, but in practical implementations the database records 600 may be limited to a tuple of (Device_ID, Hash_ID)—e.g. row 1 may be actually stored as (1, 3), (1, 7), (1, 8) and (1, 9). Using this approach, it may be observed how a size of the inventory may be reduced—the Device_ID column may have a bit length to accommodate a possible number of devices (e.g. a 32-bit integer would easily cover 500 k devices) and the Hash_ID column may have a bit length to accommodate a possible number of files (e.g. a 32-bit or 64-bit integer would allow for billions of files across the network). Hence, each record may be reduced from ~300 bytes as per comparative approaches to 1 or 2 bytes. This allows such an inventory to be practically stored and to easily scale to very large-scale networks (or put another way, to allow for very rapid processing speeds for smaller networks).

Figure 7B:
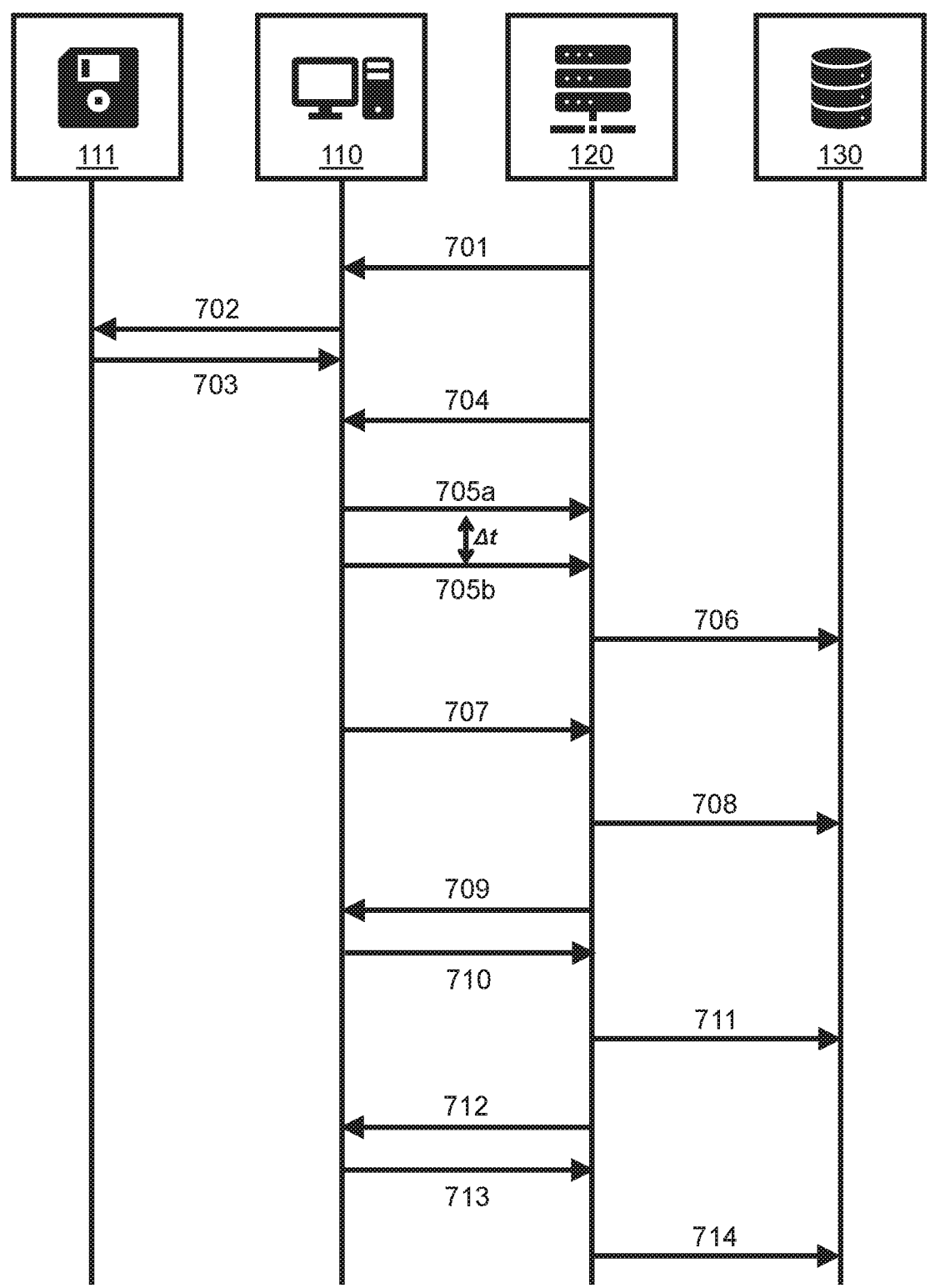

FIG. 7B shows another example of network traffic travelling between the components of the network system 100 shown in FIG. 1. Steps 701 to 704 and 706 correspond to those in FIG. 7A. However, the present example shows a number of additional steps that may be performed in certain circumstances. FIG. 7B illustrates the communication of state data at different time periods, the sending of additional state data for non-matching data signatures and the use of multiple sets of exemplar data signatures. These approaches may be used independently, as well as together as shown in the example.

In a first variation of FIG. 7A, in FIG. 7B the receipt of state data from the client computing devices 110 (step 705) is split into multiple sub-steps (705a, 705b). These multiple sub-steps may be separated in time. In this example, the server computing device 120 receives (step 705a) a first subset of the state data, corresponding to a first subset of the computing devices, at a first time. The server device 120 then receives (step 705b) a second subset of the state data, corresponding to a second subset of the computing devices, at a second time. The first and second times may be separated by a predefined time period, shown by Δt in FIG. 7B. The first and second subsets of the state update data can be processed at the server device 120 to extract state bitmaps for each of the client computing devices 110 in the same way as described above with reference to FIG. 7A. The server computing device 120 can then use the state bitmaps to update the database 130 representing the state of the network (step 706) as described for FIG. 7A. In other examples, there may be more than two subsets of the state update data, corresponding to more than two subsets of computing devices connected to the network. This approach may be applied when different subsets of computing devices are located in different geographic locations, e.g. one set of devices may be within an office network in Sydney and transmit state data at 12 am local time, and a second set of devices may be within an office network in London and transmit state data at 12 am local time (9 am local time in Sydney). Alternatively, or additionally, the transmission of state data may be staggered based on network subnets. This approach may even out network utilisation to avoid spikes in use.

In a second variation of FIG. 7A, in FIG. 7B the client computing device 110 identifies, as a result of comparing the generated data signatures with the set of exemplar data signatures, one or more generated data signatures that are not present in the set of exemplar data signatures. These one or more data signatures may correspond to one or more files accessible to the client computing device 110 that were not accessible to the exemplar computing device when the set of exemplar data signatures was generated. For example, they may correspond to files that were created by a user of the client computing device 110, additional system files for one or more I/O devices, additional application software, system data that is generated as part of the operation of the client computing device 110 etc.

In FIG. 7B, the client computing device 110 transmits (step 707) additional state data, indicative of the said one or more generated data signatures to the server computing device 120 over the network. The server computing device 120 thus receives (step 707) the additional state data from the client computing device 110 over the network. The server computing device 120 may receive additional state data from one or more computing devices over the network in response to the state request. The additional state data is indicative of one or more data signatures which correspond, respectively, to one or more files present on the one or more computing devices that do not have a representative data signature in the set of exemplar data signatures. The server computing device 120 can then use the additional state data to update (708) the state database 130 representing the state of the network. For example, this may comprise extracting a data signature from the additional state data and storing this, together with an identifier for the client computing device 110, as a record of the state database 130. Although the data signatures of the additional state data are larger in size than individual entries in the state bitmap (e.g. 128 bits as compared to 1 bit), each client computing device 110 may have a limited number of such data signatures, e.g. as a majority of files may be covered by the set of exemplar data signatures.

The example of FIG. 7B also shows several additional steps of a third variation that may be performed in addition to steps 707 and 708 to further reduce the amount of data sent over the network. These steps are performed with reference to multiple sets of exemplar data signatures, which are shown in FIGS. 5D to 5E. These Figures extend the example of FIGS. 5A to 5C.

FIG. 5D shows an example of a first set of exemplar data signatures 500 and a second set of exemplar data signatures 540. The first set of exemplar data signatures 500 is the same as that shown in FIG. 5A and described in examples above. The second set of exemplar data signatures 540 corresponds to a different set of data signatures. For example, the first set of exemplar data signatures may correspond to operating system files which may be expected to be present on each endpoint implementing the respective operating system build. The second set of exemplar data signatures, however, may correspond to common files which may be expected to be present on each endpoint that is set up in a particular way, e.g. according to particular use and/or hardware configurations. For example, a pharmaceutical testing organisation may have offices with a particular operating system build and one or more laboratories with a set of computer-controlled test equipment. In this case, the second set of exemplar data signatures may comprise common device driver files for the computer-controlled test equipment that may be sent to the client computing devices located within the one or more laboratories but not to the client computing devices located within the office location. Similarly, certain client computing devices may have a common set of word processing and spreadsheet applications, while other client computing devices may have integrated development environments and compilers for software engineering.

When multiple differing sets of exemplar data signatures are used, a further state bitmap may be generated, at a client computing device, by comparing a set of generated data signatures with the second set of exemplar data signatures. These may be the same set of generated data signatures that are compared to the first set of exemplar data signatures (e.g. the generation may be performed once or periodically). Respective comparisons may thus be carried out between the data signatures generated at the computing device and the separately received first and second sets of exemplar data signatures 500, 540. The state bitmaps may thus further indicate a presence or absence of each file hash in the second set of exemplar file hashes.

FIG. 5E shows an example where the first and second state bitmaps are combined into a single bitmap 550, with a possible visualisation 560 of this combined state bitmap 550 indicated alongside. In FIG. 5E, the third line of the combined bitmap 550 shows that the data signature e0f601b8b8b8653a77750e2abf34977a in the first set of exemplar data signatures 500 is present whereas the data signature a5dae579b161b874daa7eac2d78320c2 in the second set of exemplar data signatures 540 is absent. Comparing against multiple sets of exemplar data signatures 500, 540 may be efficient for storage and network traffic since, if the computing device has no matching data signatures in its generated set of data signatures, the resulting bitmap comprises all zeroes and hence compresses to a small data size. Although, the example of FIG. 5E shows a two-dimensional array where each column of the array corresponds to a different set of exemplar data signatures, it is also possible to provide the same data as a one-dimensional array (e.g. by arranging values for the two sets sequentially). Different approaches may be applied depending on the statistics of file presence, with approaches that minimise the data that is sent over the network being preferred. The state data 550 may further be compressed as described with respect to the previous examples.

Returning to FIG. 7B, the server computing device 120 obtains a second set of exemplar data signatures associated with a second set of files (as part of step 709). For example, the set of exemplar data signatures transmitted separately (at step 704) may comprise a first set of exemplar data signatures associated with a first set of files. The server device 120 may therefore transmit (step 709) the second set of exemplar data signatures to the client computing devices 110 over the network. The second set of exemplar data signatures may thus be received (as part of step 709) at the computing device 110 over the network. In the example shown in FIG. 7B, state data, generated based on the further state bitmap, is then transmitted from the client computing device 110 to the server computing device 120 over the network (step 710). The server computing device 120 may receive and process the state data (as previously described) to extract the further state bitmap, for example decompressing a compressed version of the further state bitmap. The further state bitmap is then used by the server device 120 to update the database 130 representing the state of the network (step 711).

In one example, the second set of exemplar data signatures may be sent based on an earlier received set of state data. This state data may comprise one or more of received compressed state bitmaps and generated data signatures that are present on a client computing device 110 but are not present in the first set of exemplar data signatures. For example, a client computing device may be characterised based on a determined presence or absence of a set of files relating to the first set of exemplar data signatures, and this characterisation may be used to select one or more of a plurality of additional sets of exemplar data signatures. Alternatively, or additionally, this characterisation may be performed based on one or more received generated data signatures. In one case, non-matching generated data signatures may be transmitted one-by-one until these signatures are deemed (e.g. at the server computing device 120) to relate to a particular pre-stored set of exemplar data signatures, in which case the pre-stored set of exemplar data signatures are sent to the client computing device 110. This check may be based on a particular proportion of generated data signatures that match a pre-stored set. For example, a particular set of hundreds or thousands of exemplar data signatures may be characterised based on a received handful of generated data signatures; sending the additional set of exemplar data signatures may significantly reduce the amount of additional data that is to be transmitted across the network. In a case where 100 128-bit data signatures need to be transmitted and 50 of those data signatures are found within a exemplar set of 1000 data signatures, transmitting the data signatures as-is uses 1.6 Kbs (128*100 bits) but using the exemplar set even without compression uses under 1 Kb (128*50+1000 bits). This incremental approach may be repeated to reduce a number of generated data signatures that are to be transmitted from a client computing device 110 to the server computing device 120.

FIG. 7B also shows the use of a fourth variation, which may be used to reduce a size of transmitted data over time. In FIG. 7B, a further state request is transmitted from the server computing device 120, over the network, and is received at the client computing device 110 (step 712). For example, the server computing device 120 may poll the client computing device 110 hourly, daily or weekly. In response to the further state request, state bitmaps of a plurality of state bitmaps are compared at the client computing device 110. The plurality of state bitmaps may have been generated at the computing device 110 in accordance with the separately received requests to obtain the state of the computing device 110 (i.e. steps 701, 712 in this example). For example, a first state bitmap may be generated in response to the initial state request (per step 701) and a second state bitmap may be generated, e.g. based on the same set of exemplar data signatures, in response to the further state request (per step 712). The first and second state bitmaps may then be compared to each other in response to the further state request. The result of the comparison may be used to generate state update data that is sent to the server computing device 120 to indicate any change in the files stored at the client computing device 110.

For example, in one case, state update data may be determined based on differences between the plurality of state bitmaps. For example, a first state bitmap may indicate that (a data signature corresponding to) a file is absent from the computing device 110 whereas a second state bitmap may indicate that the same (data signature corresponding to the) file is now present at the computing device 110, e.g. at a different time. Thus, the state update data may be determined based on this difference (or "delta") between the first and second state bitmaps. If many of the files stay the same over time (e.g. between polling intervals), then the state update data may be of a reduced size compared to the second state bitmap.

In FIG. 7B, the state update data, e.g. comprising an indication of such differences or deltas, is transmitted (step 713) from the client computing device 110 over the network. Transmitting such difference data may reduce network traffic between the client computing device(s) 110 and the server computing device 120 compared to transmitting the state bitmaps, generated in response to the further state request, over the network. The reduction in network traffic is even greater when the network is scaled up to include many client computing devices 110 served by the server device 120 (or multiple server devices 120 in some examples). For example, in one case, the state update data may comprise an integer representing a data signature with a modified presence (e.g. a transmitted value of 'n' indicates that a value for the nth data signature in the state bitmap has changed).

On the server-side in this variation, the server computing device 120 receives (as part of step 713) the state update data from the client computing device 110 over the network in response to the further state request. As described, the state update data comprises differences between a plurality of state bitmaps generated at different times. The state update data is used by the server computing device 120 to update (step 714) the database 130 representing the state of the network. For example, where the state update data indicates that a file previously absent at a particular computing device 110 on the network is now present at the same computing device 110, the database 130 holding the file records for the computing devices 110 on the network can be updated to reflect the change.

In examples, a software update may be distributed to the endpoints on the network, which may be expected to perturb the state update reporting, e.g. since thousands of file changes may be detected at each endpoint. In such cases, a new set of exemplar data signatures can be created and distributed to the endpoints instead, with data signatures in the new set of exemplar data signatures corresponding to the software update. The increase in the network traffic in such cases may be a one-time burden comparable to a typical day of state update traffic.

Certain methods of determining a state of a computing device coupled to a network will now be described. The steps of such methods may correspond with the processes, routines etc. described herein with reference to the example network computing systems 100 and their components.

Figure 8:
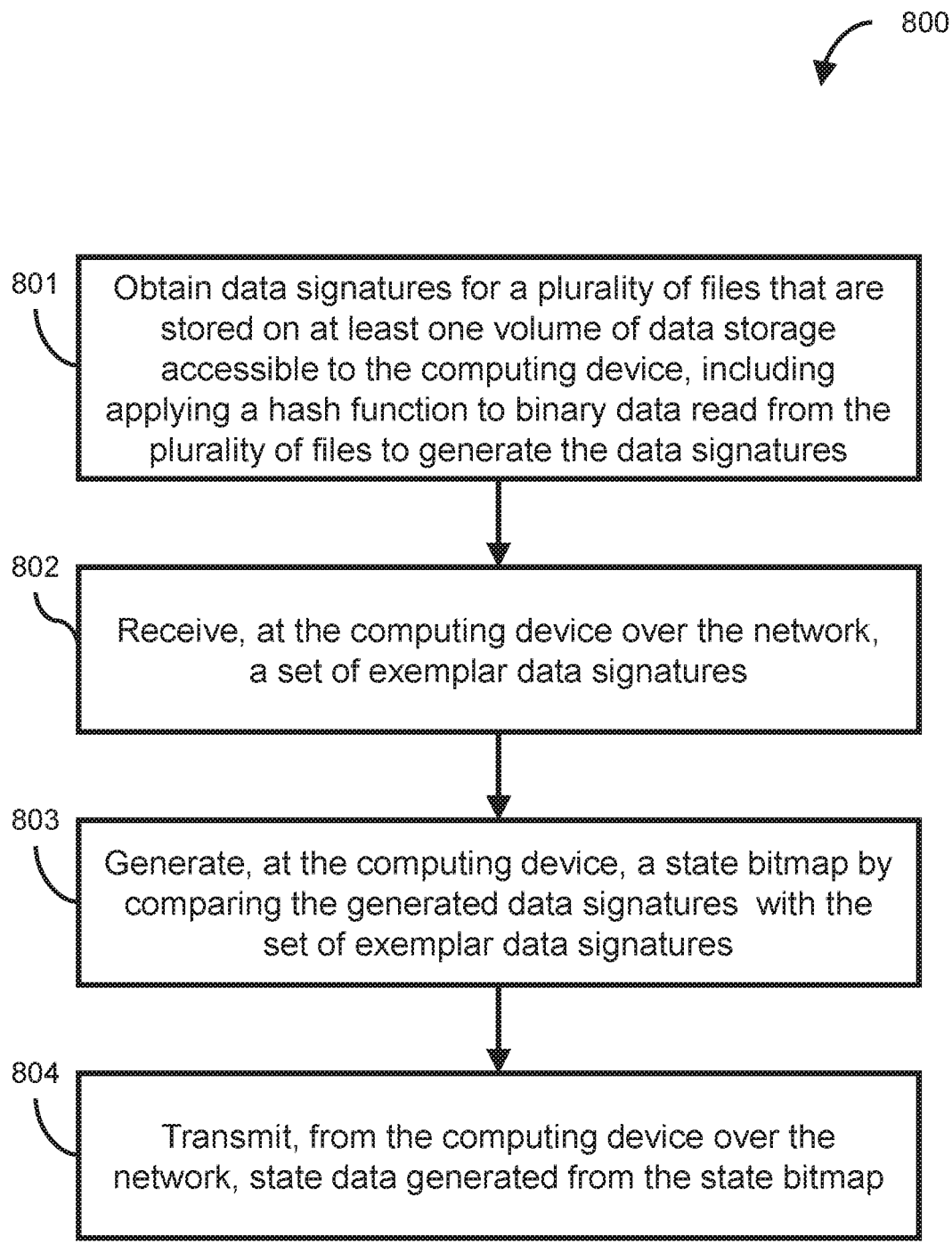
FIG. 8 is a flow diagram showing a method of determining a state of a computing device coupled to a network according to an example.

FIG. 8 shows a flowchart of a method 800 of determining a state of a computing device coupled to a network. The computing device may comprise a client computing device such as the client computing device 110 described in examples above with reference to FIGS. 7A, 7B. The method 800 may be performed at the client computing device.

At block 801, the method comprises obtaining data signatures for a plurality of files that are stored on at least one volume of data storage accessible to the computing device. In certain cases, this may be performed in response to the receipt, at the computing device, of a request sent over the network to obtain a state of the computing device. In other cases, this may be performed as a periodic or continuous process on the computing device. Block 801 includes applying a hash function to binary data read from the plurality of files to generate the data signatures. In some examples, obtaining the data signatures includes parsing, at the computing device, a file-system data file to obtain data locations for the plurality of files. As described herein, the file-system data file may comprise a master file table (MFT) as used in NTFS, or a catalogue file in an APFS or HFS Plus file system. Other types of file-system data file, e.g. for different types of file system and/or OS, may be implemented in other examples.

The data locations for the plurality of files may be storage locations at which respective files of the plurality of files are stored in the at least one volume of data storage accessible by the computing device, for example. The hash function may thus be applied to binary data read from these data locations. For example, the hash function may be applied to bit values read from the data locations, or to bytes read therefrom in hexadecimal format. In certain examples, each of the plurality of files comprises executable code. For example, the plurality of files may comprise executable program files which have encoded instructions and can cause a computer to perform indicated tasks according to the encoded instructions when the file is executed on the computer. Example formats of such executable program files are described elsewhere in this detailed description.

At block 802, the method includes receiving, at the computing device over the network, a set of exemplar data signatures. As described herein, the set of exemplar data signatures may be a result of a scan of a particular computing device, taken to be an exemplar computing device. For example, the computing device may have a particular configuration, and thus have access to a preconfigured selection of files. Although block 802 is shown following block 801, in certain cases this may be reversed, e.g. block 801 may be triggered by the receipt of a set of exemplar data signatures in block 802.

At block 803, the method also involves generating, at the computing device, a state bitmap by comparing the generated data signatures with the set of exemplar data signatures. This may comprise generating data structures similar to those shown in FIGS. 5B and 5E.

At block 804, the method also includes transmitting, from the computing device over the network, state data generated from the state bitmap. The state data may be transmitted in a file format over the network, e.g. as one or more files, for example. In other examples, the state data may be directly streamed over the network, e.g. in (compressed) network packets. In certain cases, the state data may be transmitted in a form similar to that shown in FIG. 5C. In certain cases, the state data may comprise state update data, e.g. deltas, as described above. The transmission may be directed at a server computing device or switch as set out in FIG. 1A or 1B.

In some examples, the method 800 also includes identifying, as a result of comparing the generated data signatures with the set of exemplar data signatures, one or more generated data signatures that are not present in the set of exemplar data signatures. For example, this may indicate that the computing device has access to one or more files, corresponding to the one or more generated data signatures, that are not accounted for in the set of exemplar data signatures. In such cases, additional state data, indicative of the said one or more generated data signatures absent in the set of exemplar data signatures, may be transmitted from the computing device over the network. In certain cases, this may be transmitted together with the state bitmap in the state data. The additional state data may be encoded and/or compressed as desired (although any reduction in size for compression of the additional state data will be limited, given the high entropy of this data).

In some examples, the set of exemplar data signatures comprises a first set of exemplar data signatures and the method 800 involves receiving, at the computing device over the network, a second set of exemplar data signatures. For example, the second set of exemplar data signatures may be associated with a different exemplar computing device, and/or a different configuration of the same exemplar computing device, compared to the first set of exemplar data signatures. A further state bitmap may be generated, at the computing device, by comparing the (previously) generated data signatures with the second set of exemplar data signatures. The computing device may then transmit, over the network, state data generated based on the further state bitmap. For example, the state data may be a compressed or otherwise processed version of the further state bitmap. In some cases, the second set of exemplar data signatures may be combined with the first set of exemplar data signatures to provide a superset of exemplar data signatures.

In some examples, the method 800 involves receiving, at the computing device over the network, a further state request. For example, the further state request may be received at the computing device separately to an earlier state request that precedes block 801. In response to the further state request, a plurality of state bitmaps generated at the computing device, in accordance with the separately received requests to obtain the state of the computing device, may be compared. State update data may be determined based on differences between the plurality of state bitmaps. The state update data may then be transmitted from the computing device over the network. As described herein, transmitting such difference data may reduce network traffic between the computing device and the server device compared to transmitting the state bitmaps, generated in response to the further state request, directly over the network.

Figure 9:
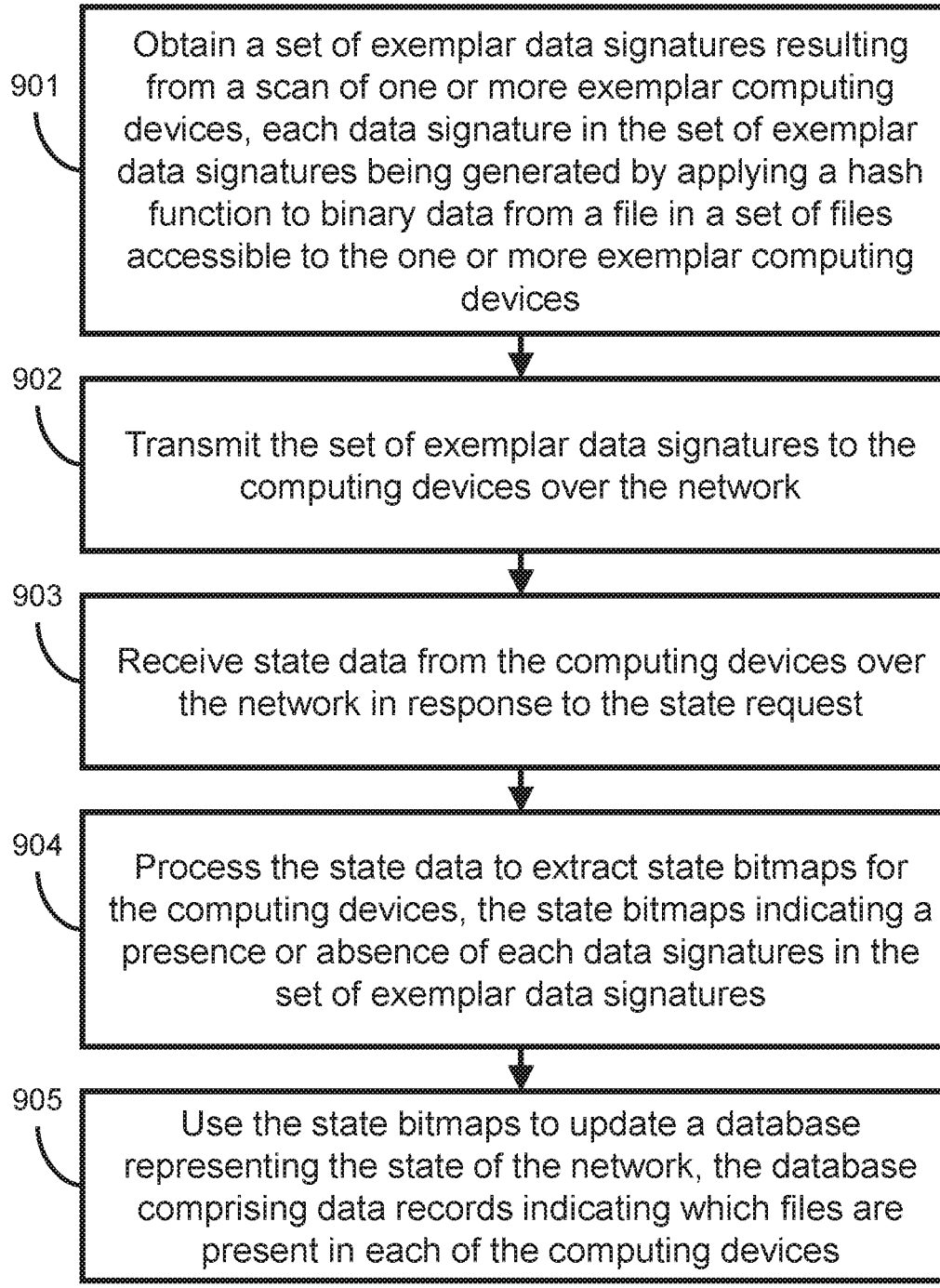
FIG. 9 is a flow diagram showing a method of determining a state of a network of computing devices according to an example.

FIG. 9 shows a complimentary method 900 of determining a state of a network of computing devices that may be performed at a server computing device or switch. The steps of such a method may also correspond with the processes, routines etc. described herein with reference to the example network computing systems 100 and their components.

At block 901, a set of exemplar data signatures, resulting from a scan of one or more exemplar computing devices, is obtained. In certain examples, this block may be performed following transmission of an (initial) state request to one or more computing devices over the network. Each data signature in the set of exemplar data signatures is generated by applying a hash function to binary data from a file in a set of files accessible to the one or more exemplar computing devices. For example, each data signature in the set of exemplar data signatures may represent a corresponding file that is accessible to the one or more exemplar computing devices.

At block 902, the set of exemplar data signatures is transmitted to the computing devices over the network. The set may be transmitted by the server computing device or the switch. In certain cases, the computing devices may access the exemplar data signatures from a network accessible storage location (e.g. using an API call). In certain cases, the set of exemplar data signatures may be distributed to the computing devices using peer-to-peer approaches, e.g. to distribute traffic more evenly over the network.

At block 903, state data is received from the computing devices over the network. For example, this may be received in response to a state request and/or in response to a computing device receiving the set of exemplar data signatures transmitted at block 902. The state data may be extracted from the payload of one or more data packets sent over the network and/or received as part of a data stream sent over a persistent data coupling created over the network. The state data may comprise compressed and/or encoded data that has been generated by the one or more client computing devices.

At block 904, the method 900 includes processing the state data to extract at least state bitmaps for the computing devices. The state bitmaps indicate a presence or absence of each data signature in the set of exemplar data signatures. For example, a given state bitmap returned from a given computing device may indicate which files are accessible to the given computing device versus the set of files, represented by the set of exemplar data structures, that are accessible to the one or more exemplar computing devices. The state bitmaps can thus be used to update a database representing the state of the network, which is shown at block 905. The database comprises data records indicating which files are present in each of the computing devices. The database may have a form similar to that described with respect to FIG. 6. Thus, the database may represent a state of the network, e.g. providing an inventory of which files are present in each of the computing devices across the network.

In some examples, the set of exemplar data signatures may comprise a first set of exemplar data signatures associated with a first set of files, and the method 900 may involve obtaining a second set of exemplar data signatures associated with a second set of files. For example, the second set of files may correspond with another configuration of the one or more exemplar computing devices, as described. In such cases, the second set of exemplar data signatures may be transmitted to the computing devices over the network and the state bitmaps, extracted from the state data files received from the computing devices, further indicate a presence or absence of each data signature in the second set of exemplar data signatures.

In some examples, the method 900 includes receiving additional state data from one or more computing devices over the network, e.g. in response to a state request. The additional state data may be indicative of one or more data signatures which correspond, respectively, to one or more files present on the one or more computing devices that do not have a representative data signature in the set of exemplar data signatures. The additional state data may thus comprise residual data signatures, e.g. those data signatures in the generated set that are left over from the comparison made with the exemplar set. The additional state data, once received at the server device, can be used to update the database representing the state of the network. For example, the one or more files represented in the additional state data may be added to the database records with an indication of the one or more computing devices that have access to these files. For example, the generated data signatures from one or more computing devices may be added to the data signature records 620 as shown in FIG. 6 and a new key value generated. In certain cases, the database may be processed to determine new or revised sets of exemplar data signatures. For example, sets of exemplar data signatures may be determined based on correlation matrices generated with respect to certain groups of computing devices. In another case, data signatures that do not form part of an existing set of exemplar data signatures but that have a frequency of occurrence above a given threshold may be selected from the database and used to generate a new set of exemplar data signatures. In this manner, the sets of exemplar data signatures may be configured based on obtained data.

In some cases, additional state data is received from a plurality of computing devices and the method 900 includes determining, based on the received additional state data, that a file not having a representative data signature in the set of exemplar data signatures is present on a number of the plurality of computing devices, the number exceeding a predetermined threshold. For example, it may be determined that a particular file is accessible to multiple computing devices on the network but is not accounted for in the set of exemplar data signatures. If this is determined to be a large enough number of computing devices, e.g. larger than the predetermined threshold, the data signature representing the file may be added to the set of exemplar data signatures for subsequently transmitting to the computing devices over the network. This may occur for a plurality of files in some examples, and can allow for the set of exemplar data signatures to adapt over time to the network and which files are prevalent across the computing devices on the network and thus may be considered to be part of an exemplar, e.g. standard, configuration for a computing device on the network In some examples, a further state request is transmitted to the computing devices over the network and state update data is received from the computing devices over the network in response to the further state request. The state update data comprises differences, e.g. deltas, between a plurality of state bitmaps generated at different times. For example, a first state bitmap generated at a given computing device based on a given set of exemplar data signatures can be compared to a second state bitmap generated at the same given computing device based on the same given set of exemplar data signatures, and the differences between the first and second state bitmaps can be transmitted as state update data. This transmitting of difference data rather than complete state data files can save network traffic between the computing devices and the server device. The state update data can be used in the same way to update the database representing the state of the network. For example, any differences encoded in the state update data can be applied to the database to update the databased based on the latest information on the state of the computing devices across the network.

In some cases, receiving state update data from the computing devices over the network comprises receiving subsets of the state update data at different times. For example, a first subset of the state update data, corresponding to a first subset of the computing devices, may be received at a first time. A second subset of the state update data, corresponding to a second subset of the computing devices, may then be received at a second time that is separated from the first time by a predefined time period. The predefined time period may be different to any network delay, e.g. queuing delay when network packets spend time in routing queues, transmission delay of the packets, or propagation delay of a signal over the network.

In some examples, the further state request includes a count request, e.g. a request for an indication of how many differences will be transmitted as part of the state update data. The method 900 may thus involve, before receiving the state update data, receiving count data from the computing devices over the network. The count data may indicate a number of differences to be sent in the state update data, e.g. corresponding to a number of data signatures that have changed in presence or absence at a given computing device on the network. For example, the count data may indicate how many differences are to be transmitted as part of the state update data. The method 900 may involve determining that the number of differences for one or more of the computing devices exceeds a predetermined threshold. In response to such a determination, the set of exemplar data signatures may be retransmitted to the said one or more of the computing devices. For example, a threshold of ten differences may be set such that, if it is determined that more than ten differences are to be transmitted as part of the state update data for a given computing device, the original set of exemplar data signatures may be retransmitted to the given computing device. In this way, if the previously transmitted set of exemplar data signatures becomes corrupted, lost, etc. then instead of reporting a high number of differences in the state update data each time (since the set of exemplar data signatures cannot be compared against) the set of exemplar data signatures is resent to the computing device(s) in question, so that comparison to the exemplar set can resume.

Figure 4:
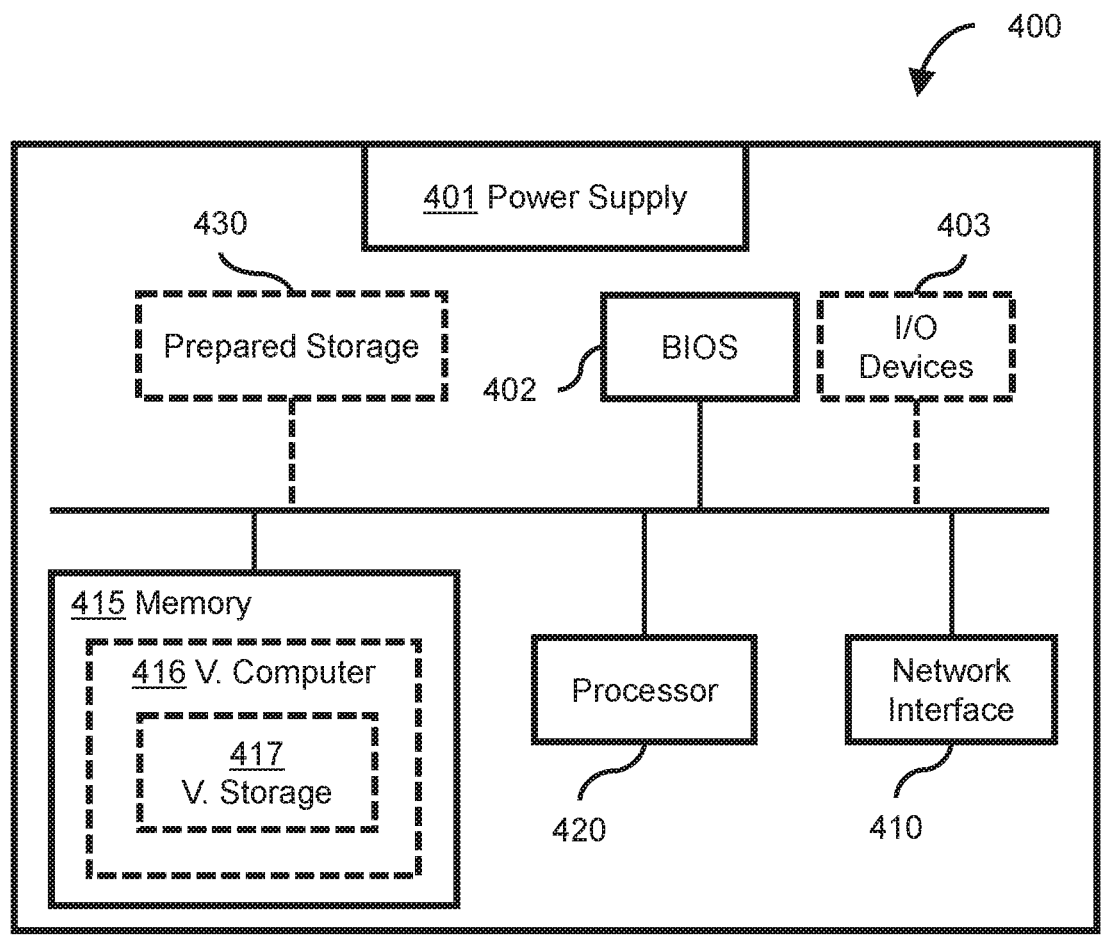
FIG. 4 is a schematic diagram showing the components of a computing device according to an example.
Figure 10:
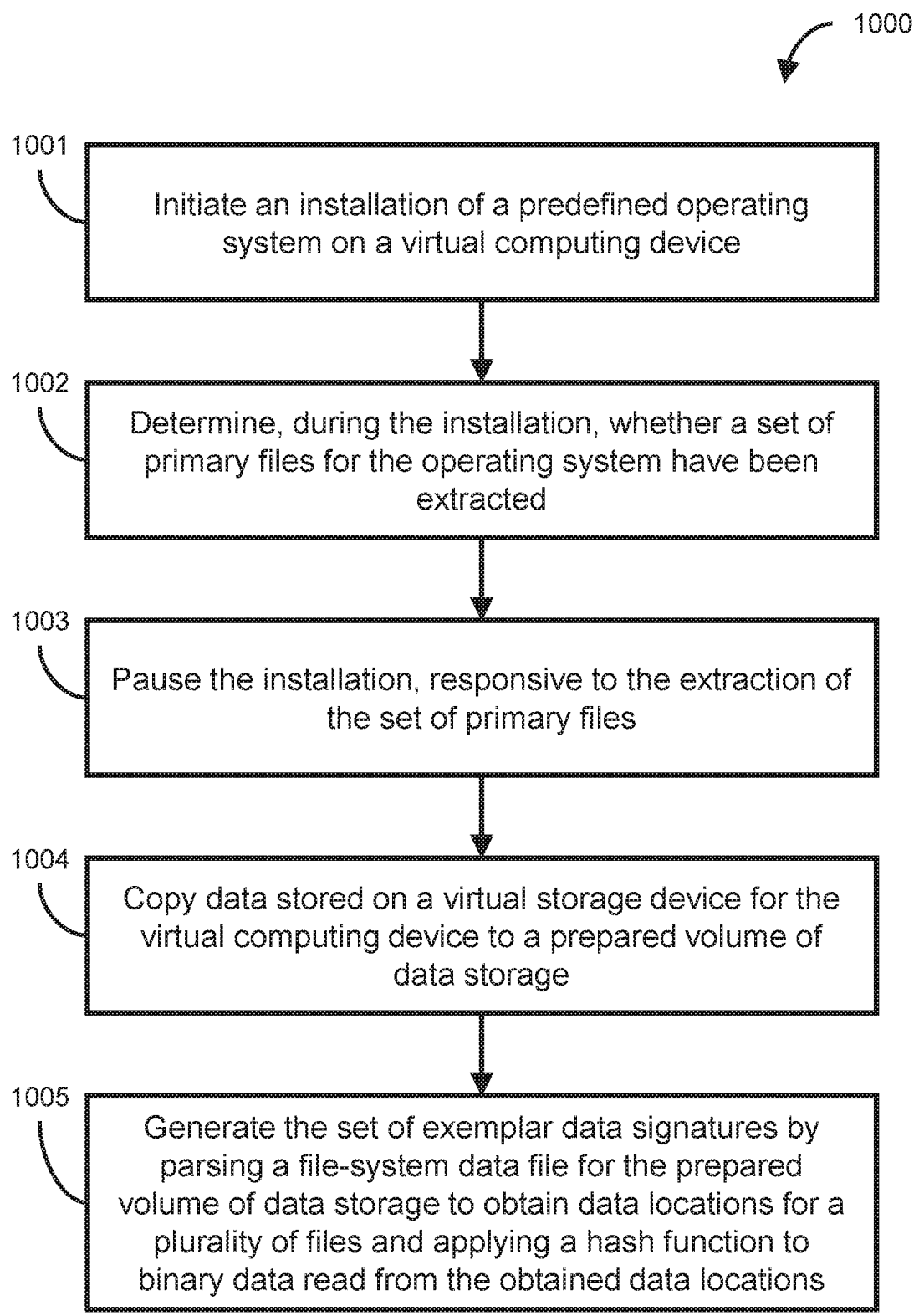
FIG. 10 is a flow diagram showing a method of generating a set of exemplar data signatures according to an example.

FIGS. 4 and 10 show how a set of exemplar data signatures may be generated according to one approach. It should be noted that multiple approaches may be used to generate the sets of exemplar data signatures, including those described above. FIGS. 4 and 10 will be referenced to described how virtual machines may be used to efficiently generate a set of exemplar data signatures FIG. 4 shows an example computing device 400 which may be utilised to carry out a method 1000 as shown in FIG. 10. The computing device 400 shown in FIG. 4 is similar to the client computing device 200 shown in FIG. 2 and the server computing device 300 shown in FIG. 3A. In one case, the method 1000 may be performed on the server computing device 300 of FIG. 3A using a configuration similar to that shown in FIG. 4. The example computing device 400 of FIG. 4 comprises a power supply 401, BIOS 402, network interface 410, processor 420 and memory 415. Similarly, the computing device 400 may have access to one or more I/O devices 403 and at least one volume of prepared storage 430.

The example computing device 400 additionally implements a virtual computing device 416, e.g. acts as a host device. The virtual computing device 416 may be run on the memory 415 of the computing device 400. The virtual computing device 416 may use a virtual storage device 417, which may be a data volume that is stored as a virtual disk drive or disk image on the example computing device 400. The virtual computing device 416 and the virtual storage device 417 may be used to generate a set of exemplar data signatures. This is described with reference to FIG. 10.

FIG. 10 shows a flowchart of a method 1000 of generating a set of exemplar data signatures for use in determining a state of a network of computing devices.

The method 1000 involves initiating, at block 1001, an installation of a predefined operating system on a virtual computing device 416. For example, this may comprise accessing an ISO file for the operating system, e.g. "inserting" a virtual optical disk. During the installation, it is determined whether a set of primary files for the operating system have been extracted at block 1002. For example, the primary files may relate to a set of core system files needed to boot the operating system within the virtual computing device and/or comprise a set of operating system files prior to configuration of a particular computing device (e.g. during later parts of an installation). The primary files may comprise a set of files that is larger in number than a set of files present when the installation completes, as, during configuration of the operating system, files that are deemed not to relate to a current configuration of the virtual computing device 416 may be deleted. In response to the extraction of the set of primary files, the installation is paused at block 1003. This may comprise pausing the operation of the virtual computing device 416 based on a trigger condition, such as a particular set of files or folder structure being present in a given location. In other cases, this may comprise not confirming a subsequent installation step (e.g. "clicking" on a "Continue with Installation" button). The installation may be paused at the point when it is determined that the primary files of the operating system have been extracted. At this point, the full file set for the operating system may be present in a pair of temporary directories which can be deleted at the conclusion of the installation. The contents of these files may be useful since otherwise, when the operating system is installed, many roles and features of the operating system may not be enabled, and the files associated with those roles and features may not be captured.

Following the pausing of the installation at block 1003, at block 1004, data stored on a virtual storage device 417 for the virtual computing device 415, e.g. within the memory 415 of the computing device 400, is copied to a prepared volume of data storage 430. For example, the prepared volume of data storage 430 may be a removable storage media, such as a USB drive, and/or an internal storage location of the computing device 400.

The set of exemplar data signatures is generated at block 1005 by parsing a file-system data file for the prepared volume of data storage 430 to obtain data locations for a plurality of files and applying a hash function to binary data read from the obtained data locations. For example, the data locations may comprise storage locations, within the prepared volume of data storage 430, at which the plurality of files are stored, e.g. with each storage location corresponding to a file of the plurality of files. Parsing the (file-system data file for the) prepared volume of data storage 430 may thus provide a set of exemplar data signatures for the full operating system build. For example, a scan from a Windows® 10 Enterprise installation may provide approximately 10,000 file hashes.

In some examples, the set of exemplar data signatures comprises a first set of exemplar data signatures, and the method 1000 involves generating a second set of exemplar data signatures. This may include scanning a computing device, having a predetermined configuration, to obtain a superset of data signatures for a plurality of files that are stored on at least one volume of data storage accessible by the computing device. For example, the predetermined configuration may correspond to the running of a specific version of an operating system, e.g. Windows® 10 build 1803. The computing device being scanned may be real or virtual, e.g. corresponding to the virtual computing device 416 run in memory 415. The method may also include removing data signatures which are present in the first set of exemplar data signatures from the superset of data signatures to obtain the second set of exemplar data signatures. For example, the superset of data signatures may comprise the union of the exemplar data signatures from the first and second sets of exemplar data signatures, which may each be resultant from a respective scan of a computing device. The data signatures in the superset which are already accounted for in the first set of exemplar data signatures can thus be removed to leave the second set of exemplar data signatures.

Certain examples described herein enable a state of a network to be efficiently determined. In certain cases, the state of the network may comprise an indication of a set of files accessible over the network, e.g. stored in relation to each device coupled to the network. These files may comprise executable code, e.g. that poses a certain security risk, and/or may comprise data files. The systems and methods described herein enable an inventory of these files to be efficiently generated at scale, e.g. even with hundreds of thousands of devices storing hundreds of thousands of files. An efficient inventory format is described in the form of a state database, which may be updated based on data exchanged over the network. The state database is efficiently constructed such that it is practically implementable within common storage sizes and may be accessed and updated rapidly. The data that is exchanged over the network is also optimised to reduce network traffic and distribution. Use of a highly compressible state bitmap format for the data exchange enables reporting to be limited to a few bytes or kilobytes of data for each network device. This may be further reduced in variations by making use of bitmap differences or deltas. The state bitmaps are generated based on exchanged sets of data signatures. These data signatures may be used to uniquely describe files while having a small fixed size, e.g. in relation to the file—typically a hundred bits or so. Data signatures may be grouped into sets based on different configurations to limit the number of "unmatched" data signatures that are transmitted from the client computing devices to a centralised server computing device. The methods and systems described herein may be implemented on large-scale enterprise networks with minimal disruption and so maybe distinguished from comparative approaches that quickly overload both the network bandwidth and inventory server resources. Certain examples therefore enable inventory at a scale that was not previously possible.

Examples as described herein may be implemented by a suite of computer programs which are run on one or more computing devices of the network. Software provides an efficient technical implementation that is easy to reconfigure; however, other implementations may comprise a hardware-only solution or a mixture of hardware devices and computer programs. One or more computer programs that are supplied to implement the embodiments described herein may be stored on one or more carriers, which may also be non-transitory. Examples of non-transitory carriers include a computer readable medium for example a hard disk, solid state main memory of a computer, an optical disc, a magneto-optical disk, a compact disc, a magnetic tape, electronic memory including Flash memory, ROM, RAM, a RAID or any other suitable computer readable storage device.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of determining a state of a network of computing devices, the method comprising:
   obtaining a set of exemplar data signatures resulting from a scan of one or more exemplar computing devices, each data signature in the set of exemplar data signatures being generated by applying a hash function to binary data from a file in a set of files accessible to the one or more exemplar computing devices;
   transmitting the set of exemplar data signatures to the computing devices over the network;
   receiving state data from the computing devices over the network;
   processing the state data to extract state bitmaps for the computing devices, the state bitmaps indicating a presence or absence of each data signatures in the set of exemplar data signatures; and
   using the state bitmaps to update a database representing the state of the network, the database comprising data records indicating which files are present in each of the computing devices.

2. A method according to claim 1, wherein the set of exemplar data signatures comprises a first set of exemplar data signatures associated with a first set of files, and wherein the method comprises:
   obtaining a second set of exemplar data signatures associated with a second set of files; and
   transmitting the second set of exemplar data signatures to the computing devices over the network;
   wherein the state bitmaps further indicate a presence or absence of each data signature in the second set of exemplar data signatures.

3. A method according to claim 1, comprising:
   transmitting a first state request to the computing devices over the network and receiving the state data in response to the first state request;
   transmitting a further state request to the computing devices over the network;
   receiving state update data from the computing devices over the network in response to the further state request,
   wherein the state update data comprises differences between a plurality of state bitmaps generated at different times; and
   using the state update data to update the database representing the state of the network.

4. A method according to claim 3, wherein receiving state update data from the computing devices over the network comprises:
   receiving a first subset of the state update data, corresponding to a first subset of the computing devices, at a first time;
   receiving a second subset of the state update data, corresponding to a second subset of the computing devices, at a second time that is separated from the first time by a predefined time period.

5. A method according to claim 3, wherein the update request comprises a count request, the method comprising, before receiving the state update data:
   receiving count data from the computing devices over the network, the count data indicating a number of differences to be sent in the state update data;
   determining that the number of differences for one or more of the computing devices exceeds a predetermined threshold; and
   in response to the determining, retransmitting the set of exemplar data signatures to the said one or more of the computing devices.

6. A method according to claim 1, comprising:
   receiving, from one or more computing devices over the network, additional state data indicative of one or more data signatures which correspond, respectively, to one or more files present on the one or more computing devices that do not have a representative data signature in the set of exemplar data signatures; and
   using the additional state data to update the database representing the state of the network.

7. A method according to claim 6, comprising receiving additional state data from a plurality of computing devices;
   determining, based on the received additional state data, that a file not having a representative data signature in the set of exemplar data signatures is present on a number of the plurality of computing devices, the number exceeding a predetermined threshold; and
   adding the data signature representing the file to the set of exemplar data signatures for subsequently transmitting to the computing devices over the network.

8. A method of generating a set of exemplar data signatures for use in determining a state of a network of computing devices, the method comprising:
   initiating an installation of a predefined operating system on a virtual computing device;
   during the installation, determining whether a set of primary files for the operating system have been extracted;
   responsive to the extraction of the set of primary files, pausing the installation;
   copying data stored on a virtual storage device for the virtual computing device to a prepared volume of data storage;
   generating the set of exemplar data signatures by parsing a file-system data file for the prepared volume of data storage to obtain data locations for a plurality of files and applying a hash function to binary data read from the obtained data locations.

9. A method according to claim 8, wherein the set of exemplar data signatures comprises a first set of exemplar data signatures, and wherein the method comprises:
   generating a second set of exemplar data signatures, including:
   scanning a computing device, having a predetermined configuration, to obtain a superset of data signatures for a plurality of files that are stored on at least one volume of data storage accessible by the computing device;
   removing data signatures present in the first set of exemplar data signatures from the superset of data signatures to obtain the second set of exemplar data signatures.

10. A server computing device comprising:
    a database interface to access a database representing a state of a network;
    data storage to store a set of exemplar data signatures resulting from a scan of one or more exemplar computing devices, each data signature being generated by applying a hash function to binary data representing a file;
    a memory comprising computer program code for a network server;
    at least one processor configured to execute the computer program code for the network server to:

instruct a transmission of the set of exemplar data signatures to one or more computing devices coupled to the network;
obtain state data communicated from the computing devices over the network;
process the state data to extract state bitmaps for the computing devices, the state bitmaps indicating a presence or absence of each of the set of exemplar data signatures; and
update data records for the database using the state bitmaps, the data records indicating which files are present in each of the computing devices coupled to the network.

* * * * *